US011687613B2

(12) United States Patent
Jacobsen et al.

(10) Patent No.: US 11,687,613 B2
(45) Date of Patent: Jun. 27, 2023

(54) GENERATING LOSSLESS STATIC OBJECT MODELS OF DYNAMIC WEBPAGES

(71) Applicant: Siteimprove A/S, Copenhagen (DK)

(72) Inventors: Mads Jacobsen, Copenhagen (DK); Per Jakobsen, Ishøj (DK)

(73) Assignee: SITEIMPROVE A/S, Copenhagen (DK)

( * ) Notice: Subject to any disclaimer, the term of this patent is extended or adjusted under 35 U.S.C. 154(b) by 0 days.

(21) Appl. No.: 17/985,311

(22) Filed: Nov. 11, 2022

(65) Prior Publication Data
US 2023/0153372 A1    May 18, 2023

Related U.S. Application Data

(60) Provisional application No. 63/279,063, filed on Nov. 12, 2021.

(51) Int. Cl.
G06F 17/00 (2019.01)
G06F 16/958 (2019.01)
G06F 40/154 (2020.01)

(52) U.S. Cl.
CPC .......... *G06F 16/972* (2019.01); *G06F 40/154* (2020.01)

(58) Field of Classification Search
None
See application file for complete search history.

(56) References Cited

U.S. PATENT DOCUMENTS

| 836,414 A | 11/1906 | Toles |
|---|---|---|
| 6,360,235 B1 | 3/2002 | Tilt |
| 7,231,606 B2 | 6/2007 | Miller et al. |
| 7,475,067 B2 | 1/2009 | Clary et al. |
| 7,558,795 B2 | 7/2009 | Malik et al. |
| 7,584,435 B2 | 9/2009 | Bailey et al. |
| 7,797,200 B2 | 9/2010 | Patrawala |
| 7,805,428 B2 | 9/2010 | Batista et al. |

(Continued)

FOREIGN PATENT DOCUMENTS

| WO | WO 2012/027022 | 3/2012 |
|---|---|---|
| WO | WO 2016/015031 A1 | 1/2016 |

OTHER PUBLICATIONS

U.S. Appl. No. 17/590,553, filed Feb. 1, 2022, Ilker et al.

(Continued)

*Primary Examiner* — Mustafa A Amin
(74) *Attorney, Agent, or Firm* — Barnes & Thornburg LLP

(57) ABSTRACT

Disclosed is technology for generating an accurate and lossless static object model of a dynamic webpage as it is rendered by a browser, including webpages that include a shadow DOM. A method includes receiving, at a computer system, a webpage, instantiating a headless web browser application to render the webpage by creating a document object model ("DOM") and a cascading style sheet object model ("CSSOM") in browser memory, the DOM and CSSOM representing dynamic rendered webpage content, injecting a probe script into the headless browser to retrieve the dynamic rendered content, traversing, by the probe script, the DOM, including traversing regular nodes of the DOM and shadow nodes of a shadow DOM, retrieving dynamic information for the regular and shadow nodes, and building a static object model based on the dynamic information.

20 Claims, 16 Drawing Sheets

(56) References Cited

U.S. PATENT DOCUMENTS

| | | | |
|---|---|---|---|
| 8,065,410 | B1 | 11/2011 | Breen et al. |
| 8,196,104 | B2 | 6/2012 | Cohrs et al. |
| 8,447,751 | B2 | 5/2013 | Stouffer et al. |
| 8,533,684 | B2 | 9/2013 | Brunet et al. |
| 8,554,698 | B2 | 10/2013 | Bando et al. |
| 8,613,039 | B2 | 12/2013 | Chen et al. |
| 8,972,379 | B1 | 3/2015 | Grieselhuber et al. |
| 9,009,784 | B2 | 4/2015 | Chen et al. |
| 9,087,035 | B1 | 7/2015 | Bandaru et al. |
| 9,152,729 | B2 | 10/2015 | Ajoku et al. |
| 9,537,732 | B2 | 1/2017 | Mukherjee et al. |
| 9,563,422 | B2 | 2/2017 | Cragun et al. |
| 10,114,902 | B2 | 10/2018 | Byakod et al. |
| 10,169,188 | B2 | 1/2019 | Belekar et al. |
| 10,534,512 | B2 | 1/2020 | Jadhav et al. |
| 10,706,122 | B2 | 7/2020 | Sabbavarpu |
| 10,831,831 | B2 | 11/2020 | Greene |
| 10,860,594 | B2 | 12/2020 | Jamshidi |
| 10,963,470 | B2 | 3/2021 | Jamshidi |
| 10,970,294 | B2 | 4/2021 | Jamshidi |
| 11,113,276 | B2 | 9/2021 | Zhao |
| 11,262,979 | B2 | 3/2022 | Desmukh et al. |
| 11,461,430 | B1 | 10/2022 | Kristoffersen et al. |
| 2004/0039734 | A1 | 2/2004 | Judd et al. |
| 2006/0195819 | A1 | 8/2006 | Chory et al. |
| 2006/0253345 | A1 | 11/2006 | Heber |
| 2008/0133500 | A1 | 6/2008 | Edwards |
| 2009/0113287 | A1 | 4/2009 | Yee |
| 2010/0042608 | A1 | 2/2010 | Kane |
| 2012/0010927 | A1 | 1/2012 | Attenberg et al. |
| 2012/0017281 | A1 | 1/2012 | Bannerjee et al. |
| 2012/0047120 | A1 | 2/2012 | Connolly |
| 2012/0081378 | A1* | 4/2012 | Roy .................. G06F 3/048 345/522 |
| 2012/0254405 | A1 | 10/2012 | Ganesh et al. |
| 2012/0254723 | A1 | 10/2012 | Kasa et al. |
| 2012/0254826 | A1 | 10/2012 | Ganesh et al. |
| 2013/0031072 | A1 | 1/2013 | Passani |
| 2013/0282691 | A1 | 10/2013 | Stouffer et al. |
| 2014/0040228 | A1 | 2/2014 | Kritt et al. |
| 2014/0047318 | A1 | 2/2014 | Glazkov |
| 2014/0164345 | A1 | 6/2014 | Connolly et al. |
| 2014/0280517 | A1* | 9/2014 | White .................. H04L 67/04 709/203 |
| 2014/0304578 | A1 | 10/2014 | Parkinson et al. |
| 2015/0039746 | A1 | 2/2015 | Mukheijee et al. |
| 2015/0317132 | A1 | 11/2015 | Rempell et al. |
| 2015/0348071 | A1 | 12/2015 | Cochrane et al. |
| 2016/0055490 | A1 | 2/2016 | Keren et al. |
| 2016/0210358 | A9 | 7/2016 | Stouffer et al. |
| 2016/0210360 | A9 | 7/2016 | Stouffer et al. |
| 2016/0224999 | A1 | 8/2016 | Mukherjee et al. |
| 2016/0335353 | A1 | 11/2016 | Gianos et al. |
| 2016/0353148 | A1 | 12/2016 | Prins et al. |
| 2017/0337168 | A1 | 11/2017 | Kunze |
| 2018/0210965 | A1 | 7/2018 | Grigoryan et al. |
| 2019/0073365 | A1 | 3/2019 | Jamshidi |
| 2019/0179879 | A1* | 6/2019 | Amiga .................. G06F 21/554 |
| 2020/0151187 | A1 | 5/2020 | Jamshidi |
| 2020/0394200 | A1 | 12/2020 | Jamshidi |
| 2021/0326348 | A1 | 10/2021 | Jamshidi |

OTHER PUBLICATIONS

U.S. Appl. No. 63/274,749, filed Nov. 2, 2021, Ilker et al.
Gustafsdottir [online], "CMS Plugin: Frequently Asked Questions," Siteimprove.com, Jul. 9, 2020, 3 pages.
Gustafsdottir [online], "How to navigate the Siteimprove CMS Plugin," Siteimprove.com, Sep. 10, 2020, 7 pages.
Kamal, "Evaluating web accessibility metrics for Jordanian Universities," International Journal of Advanced Computer Science and Applications, 2016, 7(7):113-122.
Needham [online], "CMS Plugin: Security FAQ," Siteimprove.com, Aug. 9, 2020, 2 pages.
Needham [online], "On which CMS is the Siteimprove plugin available?," Siteimprove.com, May 7, 2020, 11 pages.
Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.
Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.
Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.
Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.
Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.
Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.
Siteimprove.com [online], "Drupal," available on or before Aug. 12, 2020, via Internet Archive: Wayback Machine URL <https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01FOGCPTWX5H3ZS558V1GVEQQN>, 3 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.
Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.
Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.
Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.
Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.
Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.
Siteimprove.com [online], "Siteimprove CMS Plugin Integration Cookbook," available on or before Aug. 5, 2020, via Internet Archive: Wayback Machine URL <https://web.archive.org/web/20200805195514/https:/developer.siteimprove.com/cms-plugin-

(56) References Cited

OTHER PUBLICATIONS integration-cookbook/>, retrieved on Mar. 21, 2022, URL<https://developer.siteimprove.com/cms-plugin-integration-cookbook/>, 13 pages.
Siteimprove.com [online], "Web accessibility for all with the next generation of Siteimprove Accessibility," Mar. 20, 2020, retrieved on Mar. 21, 2022, retrieved from URL<https://siteimprove.com/en-us/blog/web-accessibility-for-all-with-next-generation-siteimprove-accessibility/>, 36 pages.
Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.
Zhou, "Evaluating Websites Using a Practical Quality Model", Software Technology Research Laboratory, De Montfort University, 2009, 113 pages.
Simo Ahava: "Track Interactions in the Shadow DOM Using Google Tag Manager I Simo Ahava's blog", EPO Form 1703 01 .91 TRI, May 11, 2020 (May 11, 2020), XP093030963, Retrieved from the Internet on Mar. 13, 2023: URL: https://www.simoahava.com/analytics/track-interactions-inshadow-dom-google-tag-manager/, 12 pages.

\* cited by examiner

```
{
    childNodesList: [ { index: 15 } ],
    element: { localNameRef: 1, attributesList: [ localNameRef: 15, valueRef: 19 ] }
},
{
    childNodesList: [ ],
    text: { dataRef: 20 }
},
{
    childNodesList: [ { index: 17 } ],
    element: { localNameRef: 1, attributesList: [ localNameRef: 15, valueRef: 19 ] }
},
{
    childNodesList: [ ],
    text: { dataRef: 21 }
},
{
    childNodesList: [ { index: 19 } ],
    element: { localNameRef: 10, attributesList: [ { localNameRef: 8, valueRef: 22 } ] }
},
{
    childNodesList: [ ],
    text: { dataRef: 23 }
},
...
{
    childNodesList: [ { index: 22 } ],
    element: { localNameRef: 25, attributesList: [ ] }
},
{
    childNodesList: [ ],
    text: { dataRef: 26 }
},
...
],
stringsList:
[
    0 : "font-weight: bold", 1 : "div", ... 6 : "body", ... 8 : "id", 9 : "styleA", 10 : "style",
    11 : "div{ font-weight: bold }", ... 13 : "List Title", 14 : "host", 15 : "role",
    16 : "list", 17 : "font-weight: normal", 18 : "open", 19 : "listitem",
    20 : "List item 1", 21 : "List item 2", 22 : "styleB", 23 : "div{ font-weight: normal }", ...
    25 : "script", 26 : "const host = document.querySelector('#host');\n const root = host.attachShadow({ mode: 'open' });\n ..."
]
}
```

Index: 14 — 1120
Index: 15 — 1122
Index: 16 — 1124
Index: 17 — 1126
Index: 18 — 1128
Index: 19 — 1130
Index: 21 — 1132
Index: 22 — 1134

1168, 1170, 1172, 1174

FIG. 11B

GENERATING LOSSLESS STATIC OBJECT MODELS OF DYNAMIC WEBPAGES

CROSS-REFERENCE TO RELATED APPLICATIONS

This application is a utility from provisional application of and claims the benefit of priority to U.S. Application No. 63/279,063, filed on Nov. 12, 2021, the contents of which are hereby incorporated by reference.

TECHNICAL FIELD

This document generally describes devices, systems, and methods related to generating lossless static object models of dynamic webpages, such as webpages that include scripts that dynamically modify webpage elements.

BACKGROUND

Webpages that are requested and presented in web browsers can identify and incorporate a variety of different files and information to render the webpage. For example, a webpage can include an HTML, which can reference various scripts, style sheets (e.g., cascading style sheets ("CSS")), images, videos, and/or other content that are retrieved and rendered as part of the website. Some content in a webpage can be static—meaning it does not change on the website—while other content on a webpage can be dynamic, which means that the content can be modified on the webpage. Some dynamic content modifications may be based on user input, such as a user selecting an option to change the layout of the website, while other dynamic content modifications may be performed automatically, such as based on a script loading and automatically modifying elements of the website.

Web browsers can use a variety of data structures to represent, manage, and present a webpage in a display. One of these data structures is a document object model ("DOM"), which stores the elements of the webpage, their attributes, and relationship to each other. The DOM can be organized in a tree structure, with nodes representing elements, such as HTML tags, and vertices representing relationships between the elements, such as one HTML tab being nested within another tag. The DOM can be dynamically modified by scripts that are loaded as part of the page, such as JavaScript files that are included and loaded with the webpage by the browser. Another data structure used by a web browser is a CSS object model ("CSSOM"), which can represent styles that have been loaded/created as part of the webpage, and that are used to style elements in the DOM. There can be mappings between the DOM and the CSSOM that are used by the browser to render the webpage.

Many web browsers additionally support the "shadow DOM," which permits for attaching a hidden separated DOM to an element. The shadow DOM permits for the nodes in the shadow DOM effectively act in a sandbox separate from the other portions of the DOM, permitting the nodes on the shadow DOM to keep their markup structure, style, and behavior hidden and separate from other code on the page. The shadow DOM can avoid conflicts between parts of the webpage. The shadow DOM allows hidden DOM trees to be attached to elements in the regular DOM tree. A shadow DOM tree starts with a shadow root, underneath which can be attached to any elements in the same way as the normal DOM. The root node of a shadow DOM can be called the "shadow root," and the node of the regular DOM tree to which the shadow root is attached can be called the "shadow host." The place where the shadow DOM ends and the regular DOM begins can be called the "shadow boundary," and the DOM tree within the shadow DOM can be called the "shadow tree."

SUMMARY

The document generally describes technology for generating an accurate and lossless static object model of a dynamic webpage as it is rendered by a browser, including webpages that include a shadow DOM. For example, accurate representations of a webpage can be challenging, particularly when taking into account different styles that are applied to different portions of the webpage. Simply performing static analysis of a webpage, including its HTML, scripts, CSS, and other files, may fail to fully present the elements of a webpage as they will be represented in the DOM and CSSOM, and rendered in the browser. Dynamically rendering a webpage in the browser can provide a more accurate representation of the webpage, but it can be challenging to accurately export a static representation of the rendered webpage from the browser because the elements of the webpage are spread across the DOM, CSSOM, and other data structures, which may further be subject to modification based on dynamic scripts that are further modifying those data structures as part of the page. The disclosed technology provides for accurate generation of a lossless static object model of the dynamic webpage as rendered by a browser in a manner that incorporates all of the different browser data sources into a cohesive and combined object model, including portions of the webpage that are intentionally separated from other portions of the webpage, such as portions represented in the shadow DOM.

The disclosed technology additionally provides for lossless representation of rendered webpages—meaning that the static object model of the webpage can be used to reproduce the complete webpage as rendered in a browser without loss of any content, styles, or information. The models that are generated for websites can be used in a variety of ways, such as permitting for a variety of different webpage analysis (e.g., accessibility assessment, search engine optimization ("SEO"), online advertising assessment) to be performed on the webpage without having to separately render the webpage for each analysis. Additionally, the models that are generated for webpages can be used to succinctly store the content of rendered webpages, which can permit for ready tracking changes and modifications to the webpage over time.

The disclosed technology can also permit for multiple different dynamic states of a webpage to be represented within a single static object model of the webpage. For example, it can be challenging to accurately represent all of the dynamic states that a webpage may encompass, such as changes in styles, layouts, hidden and/or displayed elements, and/or other dynamic changes that can occur on a dynamic webpage as it is interacted with by a user. As a result, analysis of webpages can often be limited to analyzing the webpage as it is initially rendered when the page loads, or to attempting to infer changes that will occur from analysis of the static code (instead of the dynamically rendered content). Such limitations may render analysis performed on webpages, such as accessibility analysis which is looking to identify features that pose usability problems to users with impairments, incomplete and/or inaccurate. The disclosed technology provides a way for the dynamic states of a webpage to be accurately identified and modeled, which can permit for a more complete model of the full range of content in a webpage to be generated and for analysis of the complete dynamic webpage to be performed.

Although the disclosed inventive concepts include those defined in the attached claims, it should be understood that the inventive concepts can also be defined in accordance with the following embodiments.

Embodiment 1 is a method for generating a static object model of a dynamic webpage. The method comprising receiving, at a computer system, a webpage from a web server; instantiating, by the computer system, a headless web browser application to render the webpage, wherein the headless web browser includes browser memory and is configured to render the webpage by creating a document object model ("DOM") and a cascading style sheet object model ("CSSOM") in the browser memory, the DOM and the CSSOM representing dynamic rendered content of the webpage; injecting, by the computer system, a probe script into the headless browser, wherein the probe script is configured to retrieve the dynamic rendered content of the webpage; traversing, by the probe script, the DOM, including traversing regular nodes of the DOM and shadow nodes of a shadow DOM that is attached to regular nodes of the DOM; retrieving, by the probe script, dynamic information for the regular nodes and the shadow nodes from, at least, the DOM and CSSOM, wherein the information includes style information for the DOM and shadow style information for the shadow DOM; building, by the computer system, a static object model of the webpage based on the dynamic information, wherein the static object model including (i) the regular nodes, (ii) the shadow nodes, (iii) the style information for the DOM, (iv) the shadow style information, and (v) structural features delineating separate styles applying to the regular nodes and the shadow nodes; and outputting, by the computer system, the static object model for the webpage.

Embodiment 2 is the method of embodiment 1, wherein traversing the nodes of the DOM comprises recursively traversing the DOM using a recursive function that instantiates separate recursive instances for child nodes and shadow host nodes to which a shadow root node is attached.

Embodiment 3 is the method of any one of embodiments 1 through 2, wherein the static object model includes one instance of the style information for the DOM that is positioned within an hierarchical structure of the static object model to indicate an association with only the regular nodes, and the static object model includes one instance of the shadow style information for the shadow DOM that is positioned within the hierarchical structure of the static object model to indicate an association with only the shadow nodes.

Embodiment 4 is the method of any one of embodiments 1 through 3, wherein the traversing is performed in response to detecting a load event generated by the headless browser for the webpage.

Embodiment 5 is the method of any one of embodiments 1 through 4, further comprising simulating, by the probe script, an additional state of the webpage in the headless browser; traversing, by the probe script, the DOM in the additional state, including traversing the regular nodes and the shadow nodes in the additional state; retrieving, by the probe script, dynamic state information for the regular nodes and the shadow nodes in the additional state; and adding, by the computer system, the dynamic state information to the static object model for the regular nodes and the shadow nodes.

Embodiment 6 is the method of any one of embodiments 1 through 5, further comprising: determining, by the computer system, whether the dynamic state information is different from the dynamic information for the nodes and the shadow nodes; wherein only portions of the dynamic state information that are determined to be different from corresponding portions of the dynamic information are added to the static object model.

Embodiment 7 is the method of any one of embodiments 1 through 6, wherein the dynamic information added to the static object model comprises difference information identifying only differences between the dynamic state information and the dynamic information.

Embodiment 8 is the method of any one of embodiments 1 through 7, wherein the dynamic state information is added to the static object model as data fields within data structures for the regular nodes and the shadow nodes already added to the static object model based on the dynamic information.

Embodiment 9 is the method of any one of embodiments 1 through 8, further comprising identifying a plurality of dynamic elements that are part of the webpage; wherein the simulating, the traversing, the retrieving, and the adding with regard to the additional state are performed for each of the plurality of dynamic elements.

Embodiment 10 is the method of any one of embodiments 1 through 9, further comprising: identifying a plurality of input options for each of the dynamic elements; wherein the simulating, the traversing, the retrieving, and the adding with regard to the additional state are performed for each of the input options for each of the plurality of dynamic elements Embodiment 11 is the method of any one of embodiments 1 through 10, wherein the static object model is configured to be used by multiple different webpage analysis pipelines to analyze the dynamic content of the webpage without rendering the webpage.

Embodiment 12 is the method of any one of embodiments 1 through 11, wherein the static object model is built with a hierarchy of nodes having relationships that are represented by nested relationships among the regular nodes and the shadow nodes.

Embodiment 13 is the method of any one of embodiments 1 through 12, wherein the shadow nodes are represented together and nested within the relationships with the regular nodes.

Embodiment 14 is the method of any one of embodiments 1 through 13, wherein the static object model is built with a nodes list that stores the regular nodes and the shadow nodes in an array that is addressable via a nodes list index.

Embodiment 15 is the method of any one of embodiments 1 through 14, wherein child nodes are identified within the regular nodes and the shadow nodes using references to node list index values for the child nodes.

Embodiment 16 is the method of any one of embodiments 1 through 15, wherein the static object model is further built with a strings list that stores unique string values from the regular nodes and the shadow nodes in an array that is addressable via a string list index.

Embodiment 17 is the method of any one of embodiments 1 through 16, wherein the regular nodes and the shadow nodes include references to common string list index values.

Embodiment 18 is the method of any one of embodiments 1 through 17, further including identifying one or more annotations for at least a portion of the regular nodes and at least a portion of the shadow nodes; adding the one or more annotations to the at least a portion of the regular nodes and the at least a portion of the shadow nodes in the object model.

Embodiment 19 is the method of any one of embodiments 1 through 18, wherein the one or more annotations correspond to identifications of page segments in the webpage using a segmentation engine.

Embodiment 20 is the method of any one of embodiments 1 through 19, wherein the identifications of the page segments are determined for a website that includes the webpage and other webpages.

The devices, system, and techniques described herein may provide one or more of the following advantages. For example, the disclosed technology can permit for accurate and lossless static object models of webpages to be generated, which can improve the accuracy of webpage analysis features (e.g., accessibility analysis systems, SEO analysis systems, ads performance systems, webpage quality assessment systems).

Additionally, the static object models that are generated with the disclosed technology can provide the computational efficiencies of static webpage analysis, which can be performed without the computation resources required to render and analyze a rendered webpage, while providing significant improvements in the accuracy of the analysis that is performed. For example, with static analysis there can be significant gaps and/or omissions in the analysis since the dynamically rendered content of the webpage may deviate and differ significantly from the static content as represented in the static webpage files (e.g., HTML files, scripts, CSS). The disclosed technology can permit for the webpage as rendered to be accurately represented and analyzed without having to render the webpage. Such a structure can permit for a webpage to be rendered a single time, the object model to be generated, and then for the object model to simply be shared across multiple different webpage analysis pipelines without having to be re-rendered for each pipeline—creating increased efficiency and decreasing the computation resources required across the pipelines.

In another example, the disclosed technology can permit for complete spectrum of states that may occur for a webpage to be accurately captured in a static object model, which can further increase the efficiency and accuracy with which website analysis pipelines can perform their analysis on a webpage.

The details of one or more implementations are set forth in the accompanying drawings and the description below. Other features and advantages will be apparent from the description and drawings, and from the claims.

BRIEF DESCRIPTION OF THE DRAWINGS

FIGS. 11A-B depicts an example object model generated using node and string references.

Like reference symbols in the various drawings indicate like elements.

DETAILED DESCRIPTION OF ILLUSTRATIVE EMBODIMENTS

The document generally describes technology for generating an accurate and lossless static object model of a dynamic webpage as it is rendered by a browser, including webpages that include a shadow DOM.

Figure 1:
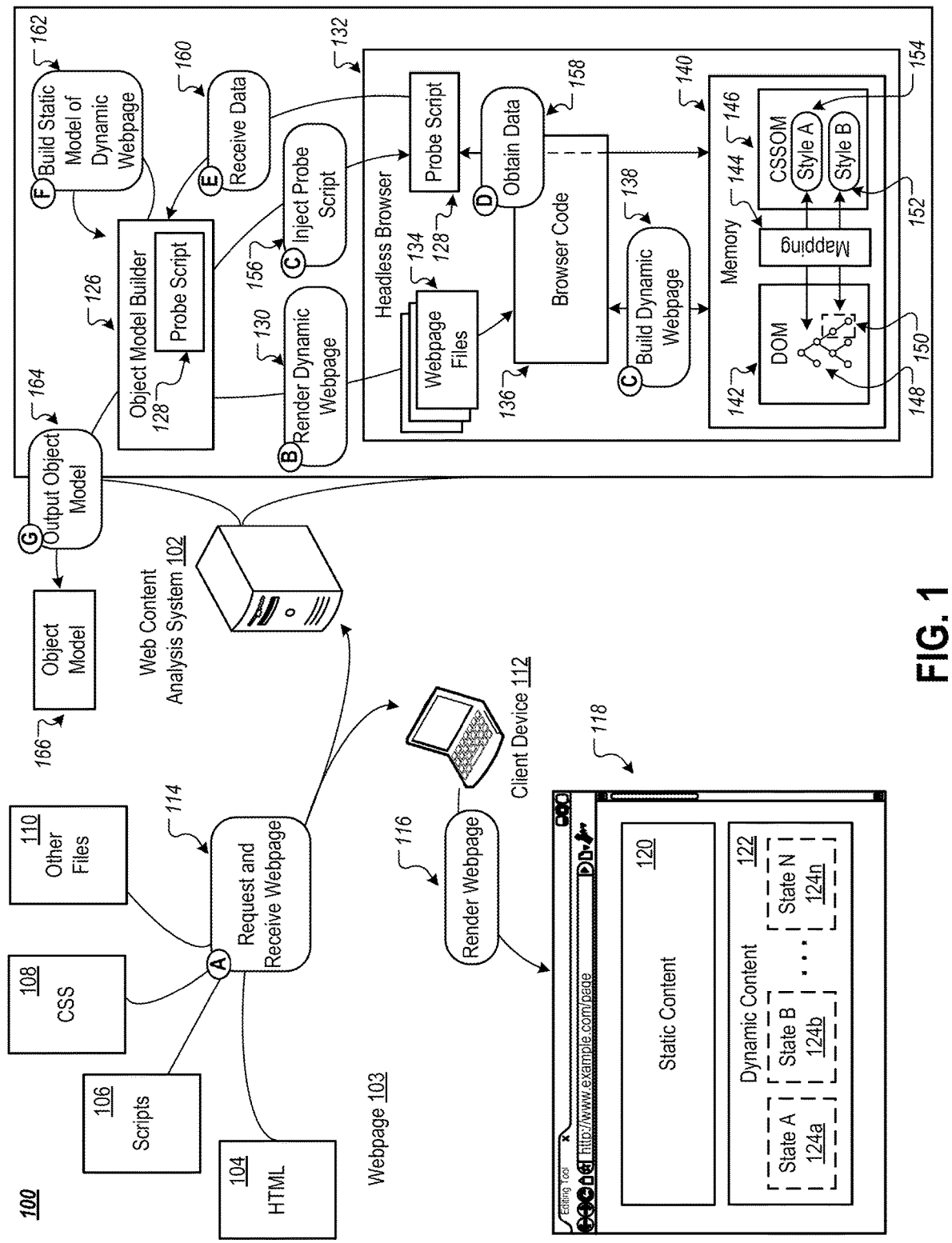
FIG. 1 is a conceptual diagram of example system for generating an object model of a webpage.

FIG. 1 is a conceptual diagram of example system 100 for generating an object model of a webpage. The example system 100 includes a web content analysis system 102 that can request and receive a webpage 103, which can include multiple different components, such as HTML 104, scripts 106 (e.g., JavaScript), CSS files 108, and/or other files 110 (e.g., images, content files, videos). The webs content analysis system 102 can be any of a variety of computer system, such as a server system, a cloud-based system, an end user device (e.g., laptop, mobile device), and/or combinations thereof.

The webpage 103 can additionally be requested by client devices 112, such as laptops, mobile devices, and/or other client computing devices, which can use a browser application 118 to render the webpage 103 using the files 104-110 (116). In the example browser 118 that is depicted, the rendered webpage 103 includes static content 120 and dynamic content 122. The static content 120 can be content that does not change as part of the webpage 103, such as an HTML tag in the HTML 104 that is not modified by a script 106. The dynamic content 122 can be content that is modified in some way (e.g., added, removed, changed) during loading, presentation, and/or use of the webpage 118 in the browser, such as elements that are modified based on user input. The dynamic content 122 may include various states A-N 124a-n that may be entered into by the browser 118 while the webpage 103 is being presented.

The web content analysis system 102 includes an object model builder 126 that is configured to build a static object model of the webpage 103 as it is rendered in the browser 118. The object model builder 128 accomplishes this through the use of a headless browser 132 (e.g., headless CHROMIUM browser), which can be run and used to render a webpage as it would be presented in the browser 118 on the client device 112 without requiring user input and/or a display. The object model builder 126 can run the headless browser 132 and direct it to render the webpage 103, as indicated by step B (130). As part of this, the headless browser can receive the webpage files 134 from the object model builder 126, and the browser code 136 can build the dynamic webpage in the browser's memory 140, as indicated by step C (138). Rendering the webpage 103 can include building a DOM 142, a CSSOM 146, and a mapping 144 there between for the webpage 103. As shown in the example that is depicted, the DOM 142 can include a regular portion 148 of the DOM as well as a shadow DOM 150, which is attached to an element of the regular portion 148 of the DOM 142, but which has a different style B 152 in the CSSOM 146 from the style A 154 that is mapped to the regular portion 148 of the DOM 142.

The object model builder 126 can inject a probe script 128 (e.g., JavaScript) into the headless browser 132 to query and retrieve data from memory 140 in order to build the object model for the webpage 103. The probe script 128 can interact with the browser code 136 (e.g., submit queries, instructions, and/or other requests for access to data in the memory 140) to obtain data from the DOM 142, the CSSOM 146, as well as the mappings 144, as indicated by step D (158). For example, the probe script 128 can traverse all of the nodes in the DOM 142, including the shadow DOM 150 and its nodes, while retrieving corresponding attributes and information about each of the nodes, which can be returned to the object model builder 126, as indicated by step E (160). The object model builder 126 can build a static object model 166 of the dynamic webpage as rendered by the headless browser 132, as indicated by step F (162). The object model 166 can be output, as indicated by step G (164), which can permit for accurate and lossless analysis of the dynamically rendered webpage 103 by other systems without having to separately render the webpage 103.

The probe script 128 may obtain the data from the memory 140 after one or more events occur for the webpage, such as a loading event having occurred indicating that the webpage has loaded in memory 140. In some instances, the data retrieved by the probe script 128 may be limited to only data from memory 140 that is retrieved on loading of the page, meaning that the resulting object model 166 represents the webpage 103 as initially loaded/rendered. In some other instances, the probe script 128 can provide simulated input, commands, and/or other instructions to the browser code 136 to cause the different states 124*a-n* of the dynamic content 122 to be rendered in memory 140, and data for each of those states 124*a-n* can be retrieved by the probe script 128 and incorporated into the resulting object model 166 for the webpage 103.

Although the above process flow and system 100 is described with regard to generating the object model 166 using the headless browser 132 (i.e., instantiating an instance of the headless browser 132 for the webpage 103), the same process flow (steps A-G) can be performed by other browsers, such as by browsers with user interfaces (e.g., CHROME browser, FIREFOX browser) configured to run on user computing devices (e.g., laptop, desktop computer, smartphone, tablet). For example, the process flow (steps A-G) can additionally and/or alternatively be performed on the web browser 118 (non-headless browser) running on the client computing device 112, which renders and presents the webpage. The object model builder 126 can be run on the client computing device 112 (e.g., Javascript code run by the browser 118 when rendering the webpage) and the probe script 128 can be injected into and used to traverse the rendered webpage data structures, including the DOM 142 and the CSSOM 146 as stored in memory (not depicted) on the client computing device 112, as described with regard to the process flow (steps A-G). Discussions of these or other features throughout this this document, even if illustrated with regard to a specific type of browser (e.g., a headless browser), can be performed by any of a variety of browsers, such as headless browsers, browsers rendering and presenting web page content, and/or other browsers.

Additionally, the process flow (steps A-G) as well as other processes, techniques, and methods described throughout this document can be performed prior to publication of web content one or more web servers. For example, the process flow (step A-G) can be performed on pre-published content, such as content that is being edited and/or previewed prior to being made available for public access on a web server. Such pre-published content may have an associated URL (i.e., internal URL that is not published or linked to from other public-facing sites) and/or may simply include content that is under development/edit without a specified URL.

Furthermore, the process flow (steps A-G) can be performed on demand—meaning that the process flow may be prompted and/or triggered in response to user selection of an option to capture and transmit the object model. For example, a user browser may be configured to include a selectable option (e.g., button, menu entry), such as through a browser plugin or through a iframe or wrapper within which another webpage is presented, that a user can select to capture the object model for a webpage, such as when a user has transitioned the webpage into a particular state.

Figure 2:
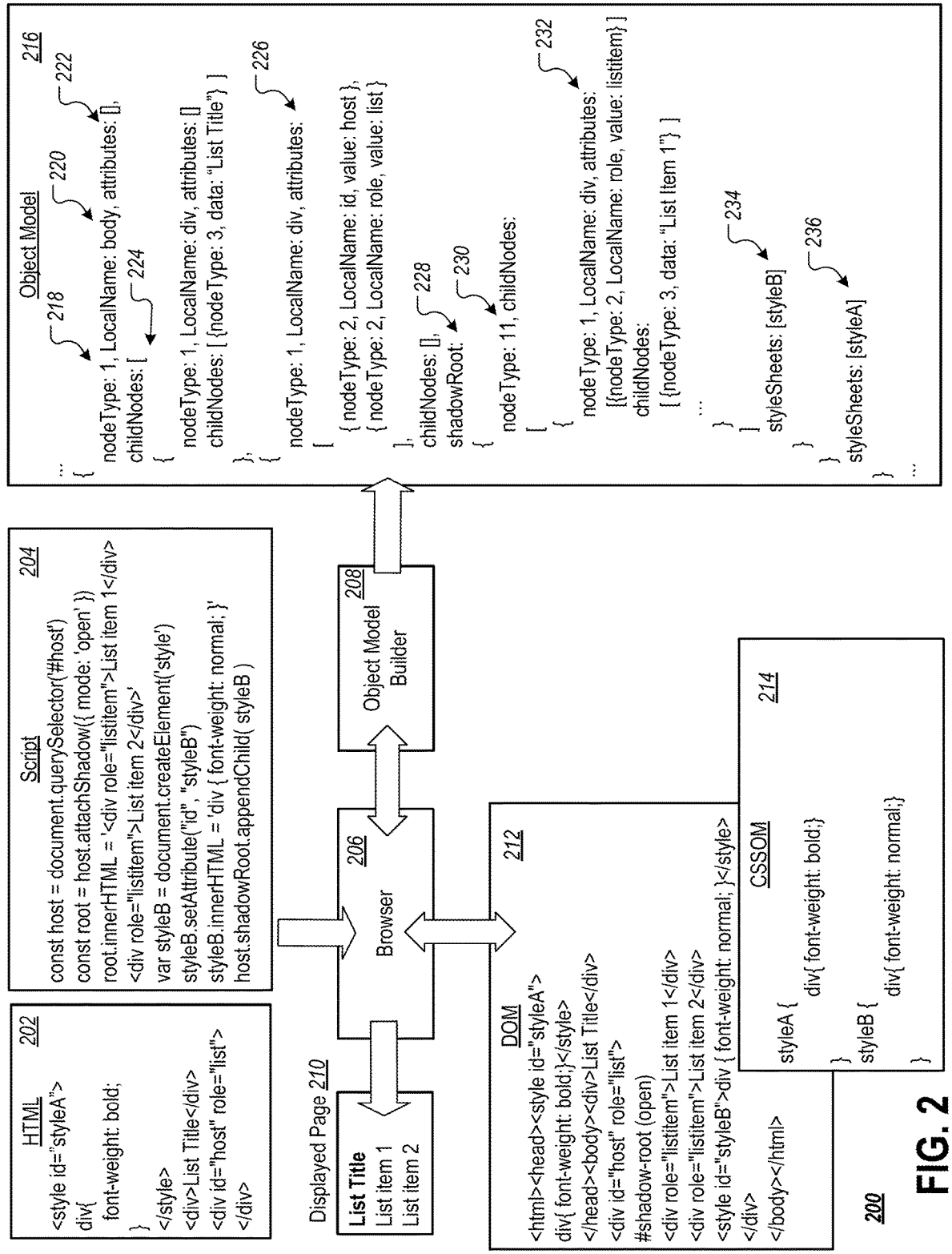
FIG. 2 is an example of an object model generated for an example webpage.

FIG. 2 is an example 200 of an object model generated for an example webpage. The depicted example 200 can be generated using any of a variety of systems, such as the web content analysis system 102.

The depicted example 200, which is simplified for illustrative purposes, includes HTML code 202 that includes a "styleA" that designates the text in DIV tags to be rendered bold, along with a DIV tag with the text "List Title" and another DIV tag with the id "host." The script 204 for the webpage includes JavaScript code to instantiate a shadow root that, when the script is run, will cause the shadow root to be attached to the "host" DIV element. The script further includes code to add two DIV elements (with the text "List item 1" and "List item 2") to the shadow root, and to further designate a "styleB" for the shadow root that uses normal font weight (not bold).

A browser 206 can receive and render the code 202-204 for the webpage, which results in generation of the example DOM 212 and the example CSSOM 214, which are both simplified for presentation. Each of the tags that are presented in the DOM 212 correspond to a node, and vertices between the nodes represent hierarchical nested relationships between the tags. Note that the DIV tag with the "host" ide includes a shadow-root that includes it's the shadow DOM with the DIV elements mentioned above.

The object model builder 208, which can be similar to the object model builder 126, can access the DOM 212 and the CSSOM 214 to generate the example object model 216, which is presented in a simplified format. The example object model 216 incorporates and combines the static and dynamic features in the DOM 212 and the CSSOM 214. In the depicted example, nodes are represented with enumerated types 218, the name of the element 220, and attributes 222 related to the element. The attributes 222 can include any of a variety of elements, such as the namespace_uir, the prefix, the local_name, and the value. Other attributes are also possible. The node 218 can further include an extensible field for child nodes 224, which can include all of the same data elements for each child node. The shadow host node 226 to which the shadow root is attached is depicted. Each element can include a "shadowRoot" field, which can designate the presence (or absence) of a shadow DOM attached to the element. In this example, the shadowRoot field 228 for the shadow host node 226 includes the shadow root node 230 which designates a document fragment separate from the remainder of the elements on the webpage. The shadow root node 230 includes the example node 232 for the DIV tag "List item 1" that is presented in the displayed page 210. The shadow root 228 further includes a stylesheet field 234 that designates the styles for the document fragment provided by the shadow DOM, which are different from the style 236 that applies to the document outside of the shadow DOM. The object model 216 can accurately model the entire dynamic content of the webpage, including the shadow DOM, in a manner that is lossless and avoids the loss of elements, styles, and/or other content.

Figure 3:
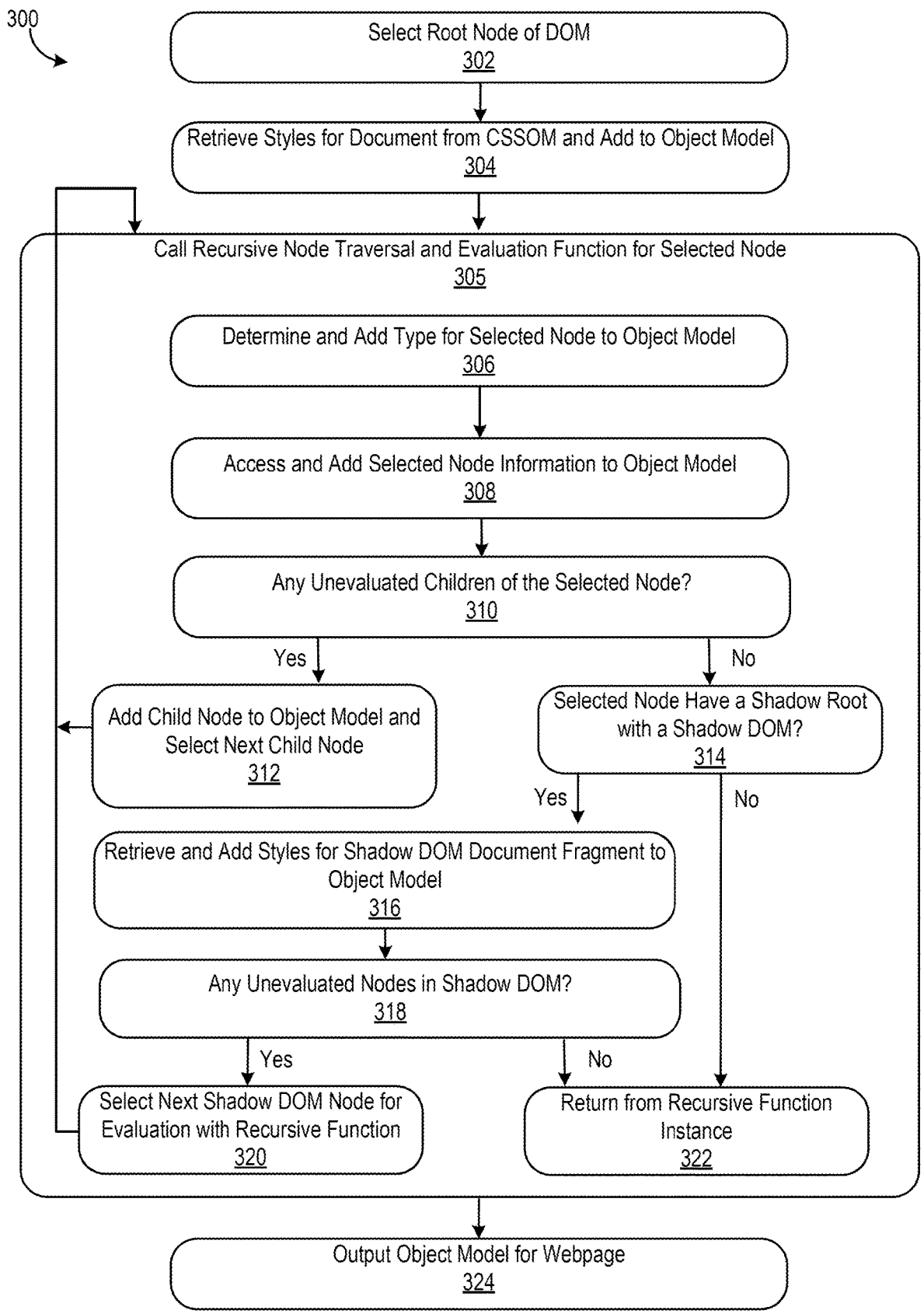
FIG. 3 is a flowchart of an example process for generating a lossless static object model for a webpage.

FIG. 3 is a flowchart of an example process 300 for generating a lossless static object model for a webpage. The example process 300 can be performed by any of a variety of systems, such as the web content analysis system 102, the object model builder 126, and/or the object model builder 208.

For a webpage rendered by a browser, such as a headless browser, the root node of the DOM for the webpage can be selected (302). For example, the probe script 128 can be injected into a headless browser and can be used to traverse the DOM for the rendered page, such as in response to a load event having been received for the webpage. Styles for the document can be retrieved from the CSSOM and added to the object model (304), such as styles that apply to the regular DOM. The object model can be iteratively built based on data that is retrieved and/or received from the probe script, which in some instances may build some or all of the portions of the object model.

A recursive node traversal and evaluation function can be called for the selected node (305). This function can include determining and adding an enumerated type for the selected node to the object model (306). Any of a variety of types for nodes can be designated and used, such as an element type, an attribute type, a text type, a comment type, a document type, and a document fragment type, such as a node designating a separated shadow DOM. Additional and/or alternative types are also possible. Information for the selected node can be accessed and added to the object model (308), such as the namespace URI, prefix, local name, value, text, attributes (e.g., elements designating values of another element, such as an id value for an element), and/or other information. If there are any unevaluated children of the selected node (310), then a child node can be added to the object model (e.g., element for the child node added to model) and the next child node can be selected (312). The selected child node is then processed through another instance of the recursive function 305. The recursion can continue through all nodes of the DOM until the full DOM has been traversed and added to the object model for the webpage.

If there is not an unevaluated child node of the selected node (310), then a determination can be made as to whether the selected node has an attached shadow root with a shadow DOM (314). If there is a shadow root at the selected node (314), then the styles for the shadow DOM document fragment can be retrieved and added to the object model, along with a node in the object model for the shadow root (316). For example, the shadow root node 230 can be added for the shadowroot field 228, and the styles 234 applying to the shadow root can be added to the shadow root 228, as well. Once the shadow root has been added to the object model, the shadow DOM for the shadow root can be traversed in the same way as other nodes that are part of the regular DOM. A determination can be made as to whether there are any unevaluated nodes of the shadow DOM (318). If there are, then the next node from the shadow DOM can be selected for evaluation by the recursive function 305 (320). By traversing into the shadow DOM, the entirety of the DOM can be replicated into the object model, permitting for the complete DOM to be captures. Additionally, by designating that the elements of the shadow DOM are part of a document fragment associated with a separate group of styles, the object model can be lossless. If there are no more nodes of the shadow DOM remaining (318) or if the selected node does not have a shadow root (314), then the recursive function instance for the selected node can return (322), which simply returns processing back to the parent recursive instance that called the present recursive instance. Once all recursive instances have been returned, then the object model can be output for the webpage (324).

Figure 4:
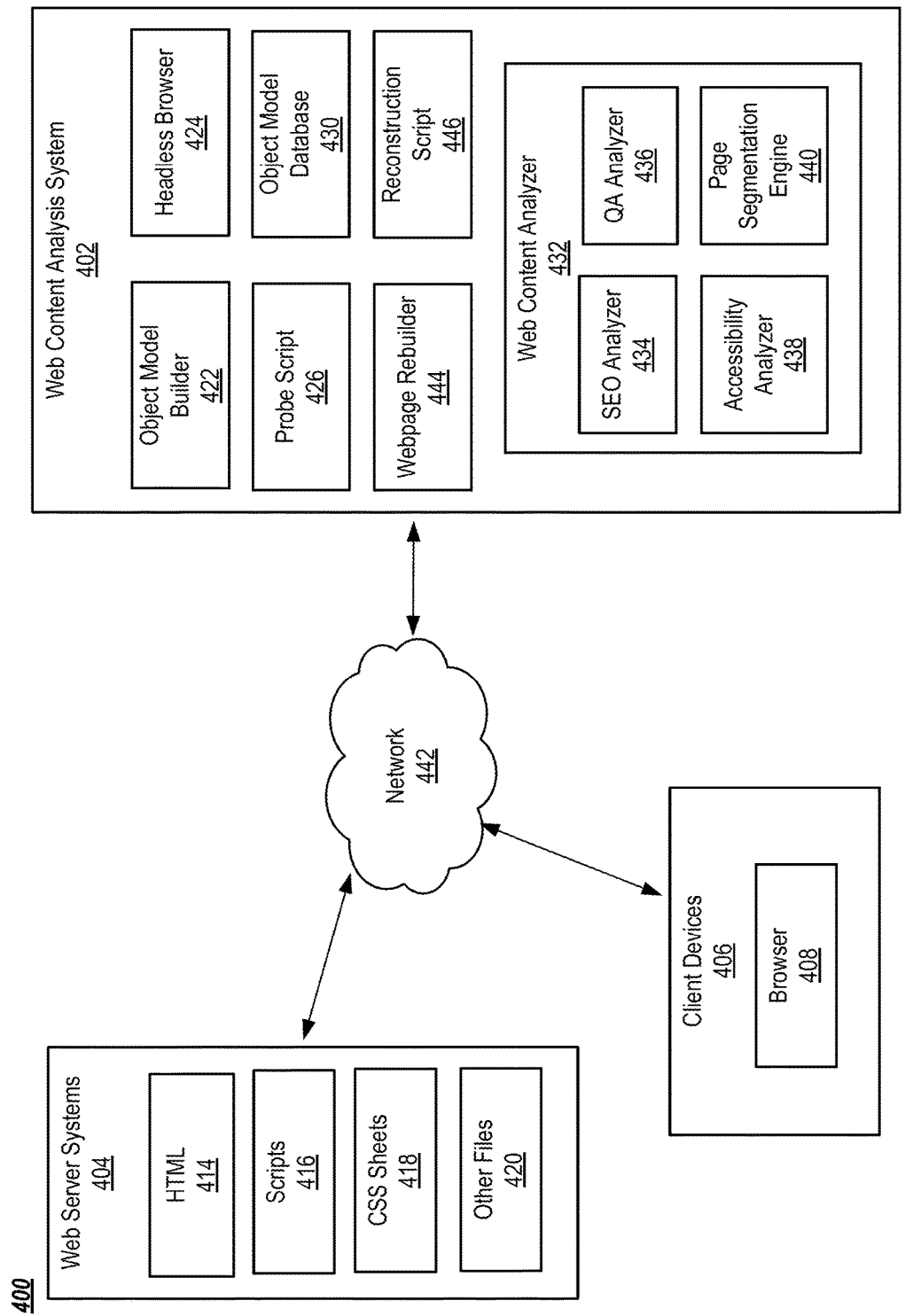
FIG. 4 is a diagram of an example system for generating lossless static object models for webpages.

FIG. 4 is a diagram of an example system 400 for generating lossless static object models for webpages. The example system 400 includes a web content analysis system 402, which can be similar to the web content analysis system 102 and other systems/processes described throughout this document.

The web content analysis system 402 includes an object model builder 422, which can be similar to the object model builder 126 and/or the object model builder 208, described above. The object model builder 422 can request and receive webpages over one or more networks 442 (e.g., internet, local area networks, wide area networks, virtual private networks) from web server systems 404. The webpages can include multiple different types of files and data that are hosted and served by the web server systems 404, such as HTML files 414, scripts 416, CSS sheets 418, and/or other files 420 (e.g., image files). The object model builder 422 can provide webpage files to a headless browser 424, which can render the dynamic webpage as described above. The object model builder 422 can inject one or more probe scripts 426 into the headless browser 424 to obtain information on the dynamic webpage as rendered by the headless browser 424. The object model builder 422 can use that information to generate an object model for the webpage, which can be stored in an object model database 430. The object model database 430 can be any of a variety of data storage systems, such as a cloud based data storage system, and may be configured to store instances of the object model for a particular website over time (e.g., generate and store an object model for the webpage every time it is crawled by a web crawler, such as hourly, daily, weekly, monthly).

The web content analysis system 402 further includes a web content analyzer 432, which can be used to assess an overall quality of the webpage. The web content analyzer 432 can include separate analysis pipelines, such as an SEO analyzer 434, a QA analyzer 436, an accessibility analyzer 438, and/or a page segmentation engine 440. The page segmentation engine 440 can use various techniques, systems, and/or processes, such as machine learning techniques, to automatically identify segments of a webpage, such as menus, headers, footers, and/or other structural and/or content-based segments or sections within a webpage. An example of a page segmentation engine 440 is described in U.S. Serial Nos. 17/590,553 and 63/274,749, the entire contents of which are herein incorporated by reference. Additional and/or alternative analysis pipelines are also possible. The web content analyzer 432, which may combine the results of each pipeline, as well as each of its separate pipelines 434-440 may access and use the object model for a webpage from the object model database 430, which can permit for the dynamic content of the webpage to be analyzed without each analyzer 432-440 having to separately render the dynamic webpage.

The web content analysis system 402 also includes a webpage rebuilder 444 and a reconstruction script 446. The webpage rebuilder 444 can reconstruct webpages, including their structure, content, and styles, including both static and dynamic content, using object models generated by the object model builder 422 and stored in the object model database 430. The webpage rebuilder 444 can use a reconstruction script 446, which can interface with the headless browser 424 to reconstruct the webpage within memory (i.e., reconstruct the DOM and CSSOM) using the object models in the object model database 430. The webpage rebuilder 444 and reconstruction script 446 may be used by one or more portions of the web content analyzer 432 to perform their web content analysis. Additionally and/or alternatively, the web content analyzer 432 and its components 434-440 can access the object models stored in the object model database 430 to perform their analysis. The webpage rebuilder 444 and reconstruction script 446 may be separate from and called by the web content analyzer 432 (i.e., as an API), and/or they may be implemented as part of the web content analyzer 432 and/or one or more of its components 434-440.

The system also includes client devices 406 that can also interact with the web server systems 404 to present webpages in a browser application 408.

Figure 5:
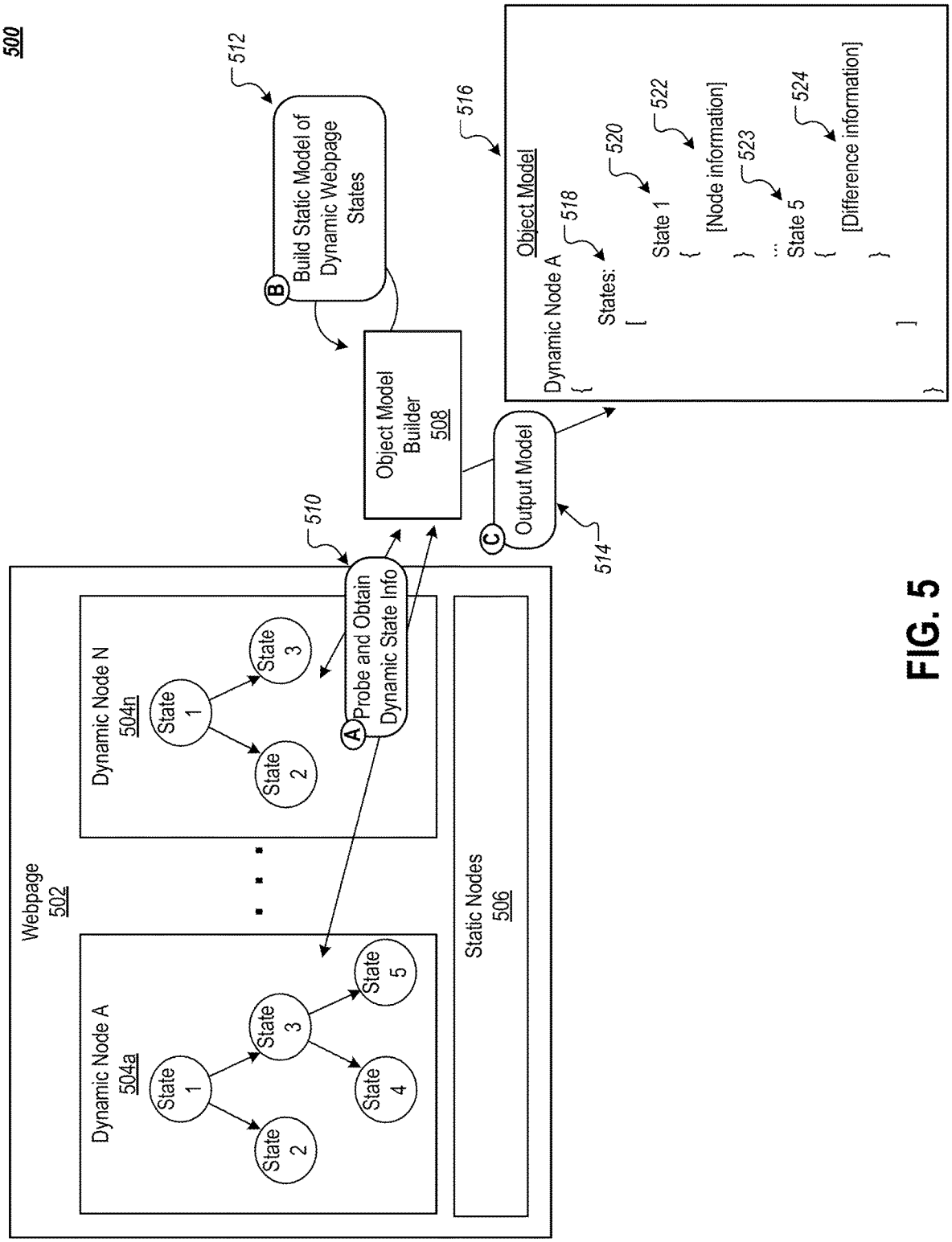
FIG. 5 is a conceptual diagram of an example system for generating a static object model incorporating multiple states of dynamic elements in a webpage.

FIG. 5 is a conceptual diagram of an example system 500 for generating a static object model incorporating multiple states of dynamic elements in a webpage. The system 500 can be similar to the systems 100, 200, and 400 described above.

In the depicted example system 500, the webpage 504 includes dynamic content, such as dynamic scripts that are part of the webpage, that can cause nodes A-N (504a-n) to enter various states. The webpage 502 can also include static nodes 506 that, based on the configuration of the webpage, do not change. In the depicted example, the object model builder 508 can probe and obtain state information for the dynamic nodes 504a-n, as indicated by step A (510). For example, the probe script 426 can be configured to inject various commands, simulated inputs, and/or other instructions to the headless browser to get the browser to cause the webpage to assume the states for the dynamic nodes 504a-n. When each of these states are achieved, the probe script can capture information about the dynamic nodes 504a-n, which the object model builder 508 can used to build a static model of the dynamic webpage states, as indicated by step B (512). An example process for doing this is described below with regard to FIGS. 6A-B. The object model builder 508 can output the model once generate, as indicated by step C (514).

An example depiction of a static model 516 that includes dynamic state information for webpage elements is presented. In the example, which is shown for illustrative purposes, the dynamic node A includes an additional state field 518 that can include information about the dynamic node 504a in each of the states that are represented. For example, an element for "State 1" can be added along with information 522 about the node 504a (e.g., text, attributes) when it was in "State 1." Information for each of the states for node 504a can be presented, such as with the element 523 for "State 5." In order to reduce the size of the object model, particularly when a webpage has a large number of elements that are capable of assuming multiple different states, the node information for subsequent states can optionally include difference information 524, which is a difference in the information from the information for one or more of the other states for the node 504a (e.g., difference as compared against the first state). Such a configuration can minimize the size of the resulting object model without losing any of the details.

Figure 6A:
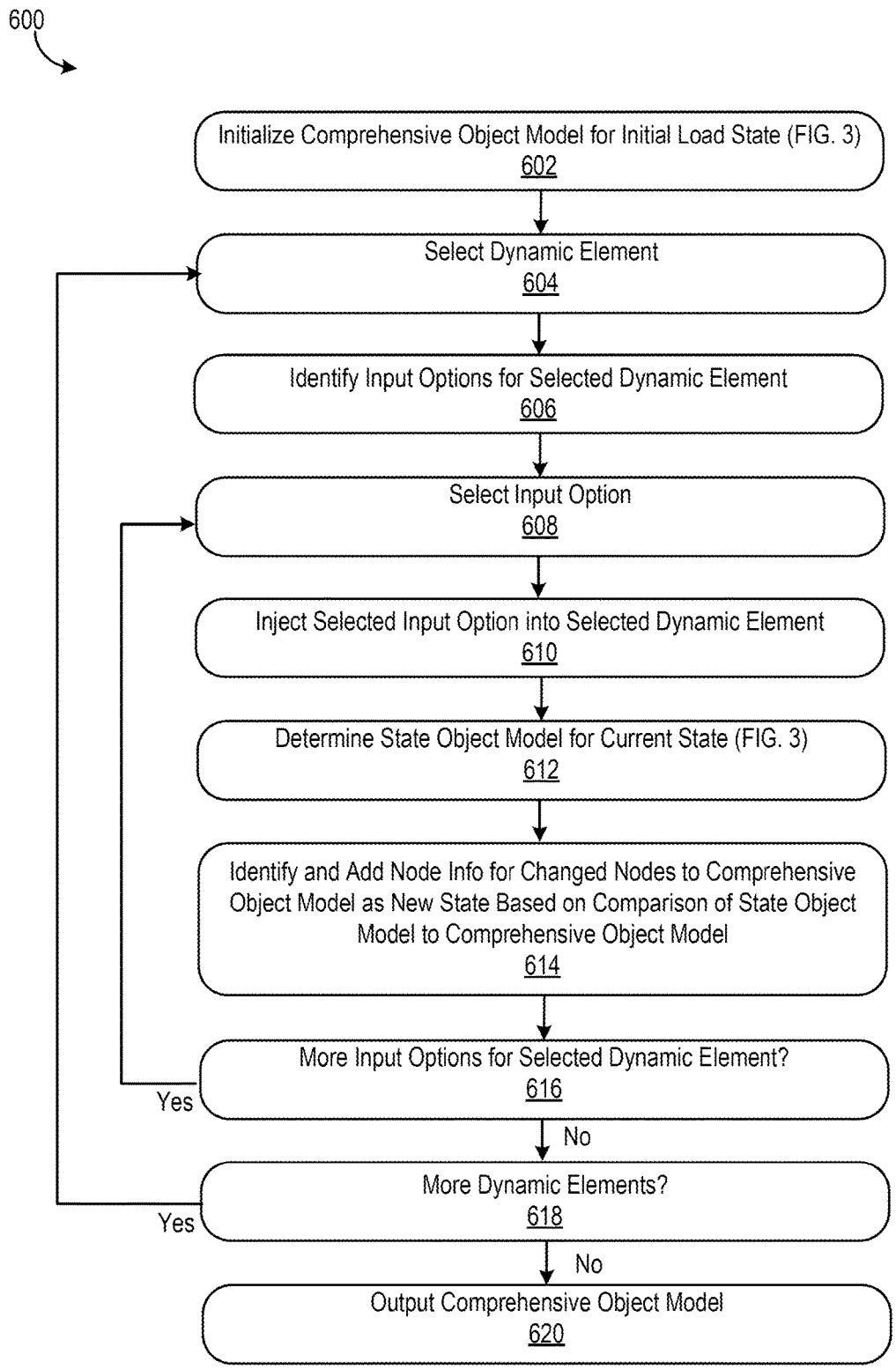
FIGS. 6A-B are flowcharts of example processes for generating a static object model incorporating multiple states of dynamic elements in a webpage.
Figure 6B:
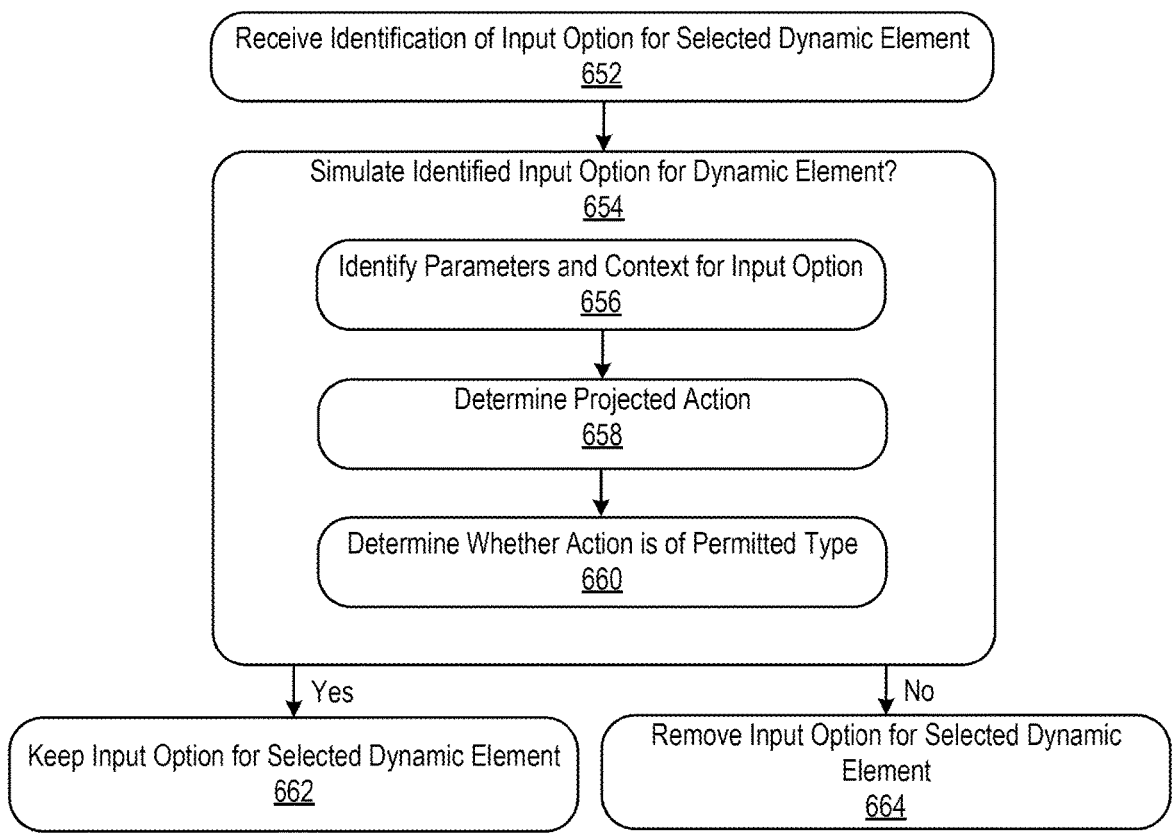

FIGS. 6A-B are flowcharts of example processes 600 and 650 for generating a static object model incorporating multiple states of dynamic elements in a webpage. The processes 600 and 650 can be performed by any of a variety of systems, such as the web content analysis system 102 and its component parts, the object model builder 208, the web content analysis system 402, and/or the object model builder 508. The processes 600 and 650 can be used, for example, to generate the static model capturing dynamic states of a website, such as the model 516 described above with regard to FIG. 5.

Referring to FIG. 6A, a comprehensive object model for the initial load state of a webpage can be generated and initialized (602). For example, an object model of a webpage when loaded can be generated, for example, using the process 300 described above with regard to FIG. 3. This initial object model can serve as a starting point from which various states of the webpage can be achieved, and into which states information for elements can be added.

A dynamic element can be selected (604). A dynamic element can include, for example, elements that have event listeners attached to them (e.g., JavaScript event listeners), elements that are capable of receiving user input, elements that have script attached to them, and/or others dynamic elements. Input options for the selected dynamic element can be identified (606). For example, the various types of events that can be generated for a corresponding event listener can be determined. In another example, if a user input field includes an enumerated set of selectable options for a user, such as a drop down menu or selectable radio buttons, each of the options can be identified as an input option. The identified input options may be limited to only options that are determined to result in one or more permitted actions (i.e., permitlist actions) being performed on the webpage and/or that are determined to not perform one or more denied actions (i.e., denylist actions) from being performed. Permitlist and denylist actions may be used, for example, to avoid the probe script from performing harmful actions, such actions that may result in an account being deleted, content being posted to a third party site, and/or other actions that may be bad if performed. An example algorithm to identify input options to be performed is described below with regard to FIG. 6B and process 650.

A first input option can be selected (608) and input to the dynamic element to cause the webpage to, potentially, achieve a different state for one or more nodes (610). To determine whether a different state is achieved, a state object model for the current state of the webpage can be generated, for example, using the process 300 (612), and can be compared against the initial state of the webpage as represented in the comprehensive model of the webpage (614). New states may be achieved for nodes associated with the dynamic element, and/or for other nodes that are not associated with the dynamic element. The new states can be identified, for example, by identifying differences in node values between the state object model and the initial state reflected in the comprehensive model. If differences are identified for nodes, then they can be added to the comprehensive model in an additional state, including the entire state information for the nodes and/or only difference information as compared against the initial state information for the nodes.

If more input options are available for the selected dynamic element (616), then the steps 608-612 can be repeated until all input options have been tested and state information has been added to the comprehensive model. Once all of the input options have been exhausted, a determination can be made as to whether there are more dynamic elements on the webpage (618). If there are more dynamic elements, then the steps 604-616 can be repeated for each dynamic element. Once all of the dynamic elements and their input options have been tested and evaluated, then the comprehensive object model can be output (620).

Referring to FIG. 6B, the process 650 includes receiving identification of an input option for a selected dynamic element (652). The process 650 may be performed for each input option identified for a selected dynamic element. A determination can be made as to whether the input option should be simulated for the dynamic element (654), which can include determining whether the action to be performed by the input option would be permitted (i.e., on a permitlist of permitted actions) and/or not permitted (i.e., on a denylist of unpermitted actions).

Parameters and context for the input option can be identified (656). For example, the destination URL for an input option, parameters to be passed with and/or appended to the destination URL, metadata associated with the input option, a position of the input option within a DOM tree for the website, a segment of the website within which the input option appears, text that is part of and/or positioned nearby the input option, and/or other information can be identified.

A projected action associated with the input option can be determined (658). For example, the parameter and the context information for the input option can be used to project an expected action that will caused to be performed via the input option without performing the action. Such a determination can be made, for example, using one or more machine learning models that are trained on the webpage and/or website from which the website is retrieved. For example, input options, their resulting actions, and associated parameters and/or context for various webpages on a website can be used to train a machine learning model for the website that can then be used to estimate an expected action associated with the input option. Models for similar or related websites may be used for other websites, such as websites that are designed by similar web design services and/or software systems may be sufficiently similar to permit for models trained on one website to be used on other, similar websites.

A determination can be made as to whether the projected action is of a permitted type and/or of an unpermitted type (660). For example, as discussed above, the determination of whether the projected action is permitted can be based on permitlists and/or denylist of actions—defining actions that are permitted as an identified input option (i.e., action on a permitlist) or actions that are not permitted as an identified input option (i.e., action on a denylist). If the action is of a permitted type, then it can be kept on a list of input options for the selected dynamic element (662), and subsequently processed through steps 608-620 of process 600. If the action is not of a permitted type (664), such as via the action either not being on a permitlist (if permitlists are being used) and/or is present on a denylist (if denylists are being used), then the input option can be removed as an input option for the selected dynamic element (664). Removing the input option can result in the input option not being included in the identified input options in step 606, and also the input option not being processed through steps 608-620.

Figure 7A:
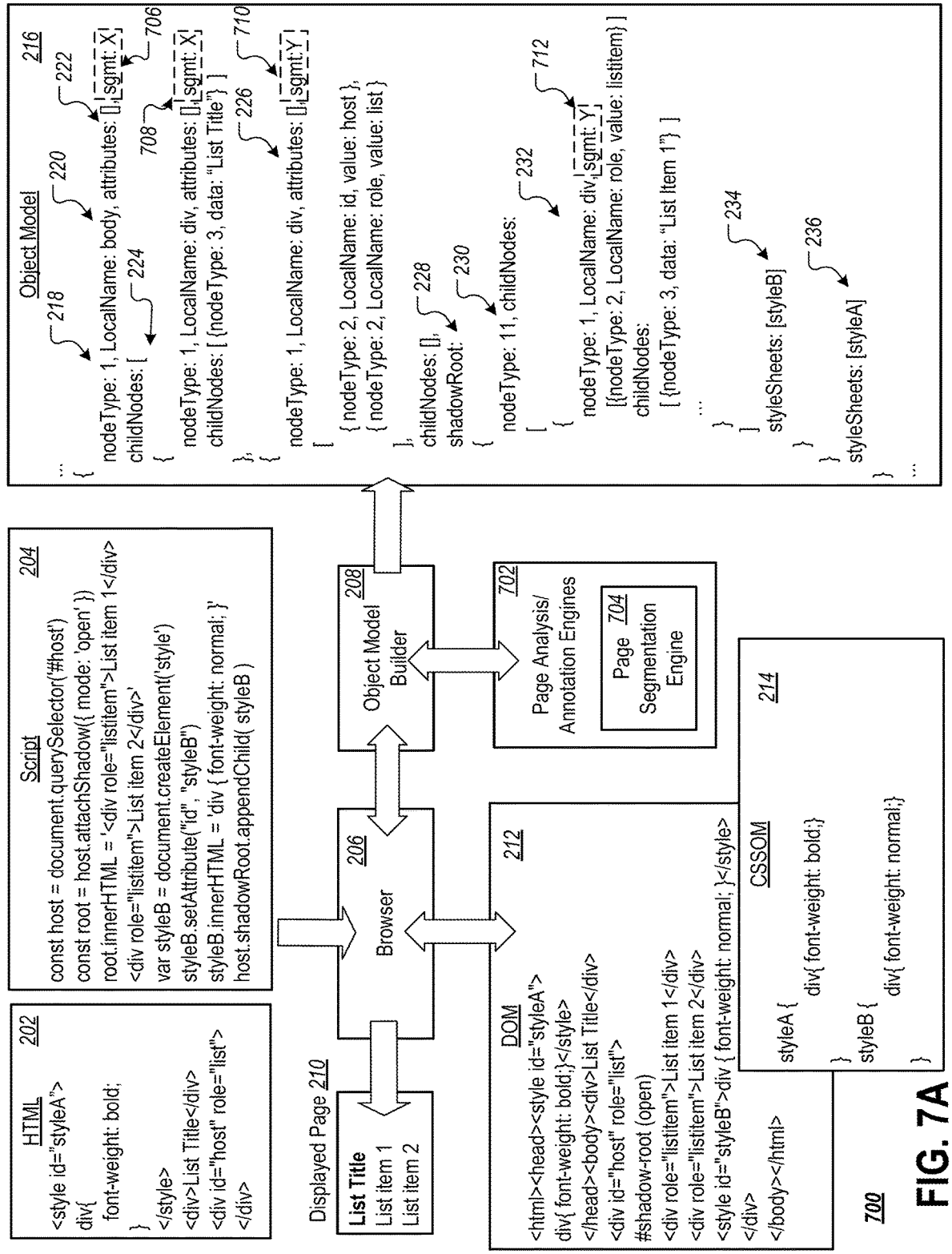
FIGS. 7A-B are conceptual diagrams of example systems for adding annotations to an object model of a webpage.
Figure 7B:
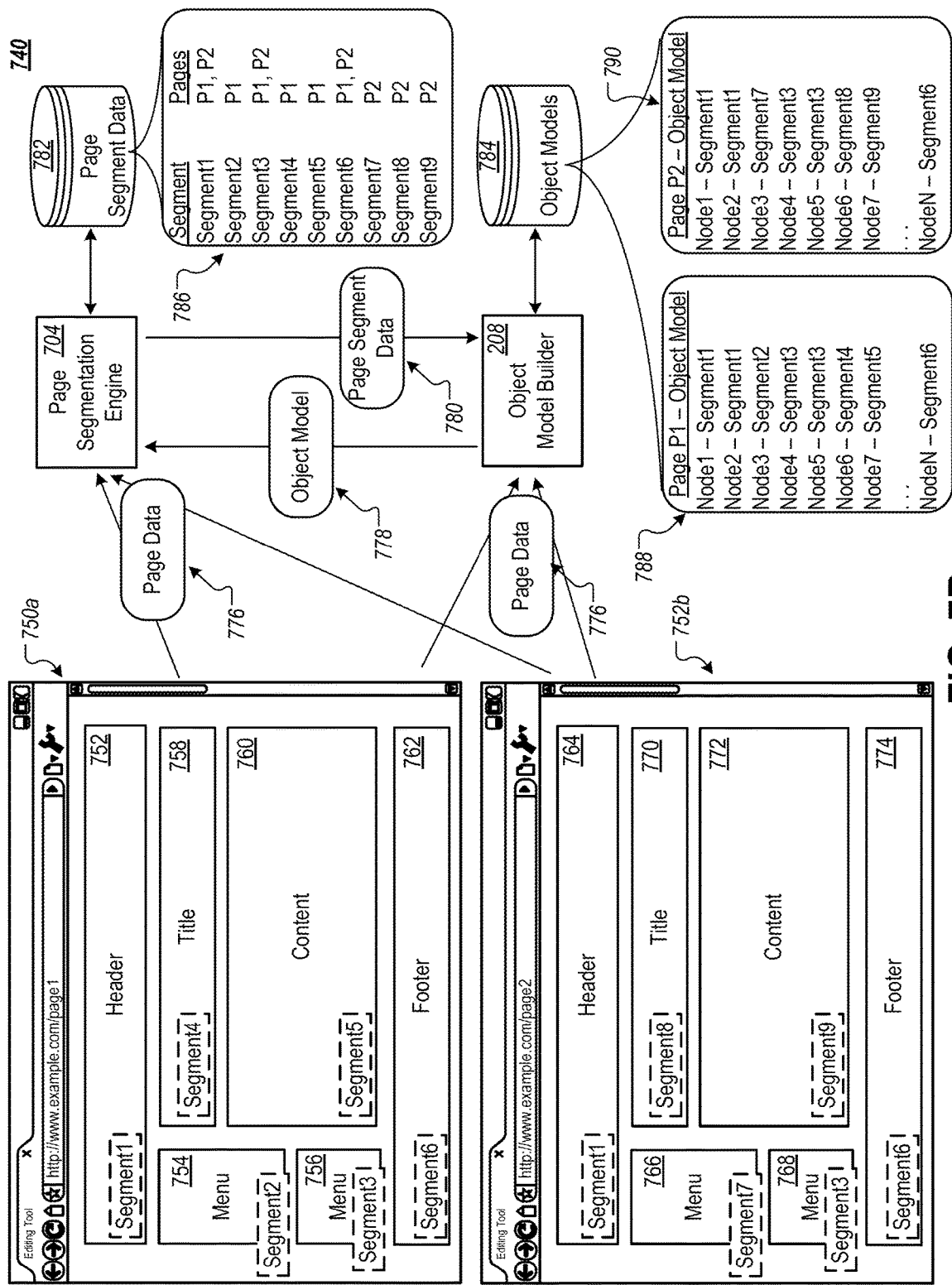

FIGS. 7A-B are conceptual diagrams of example systems 700 and 750 for adding annotations to an object model of a webpage. The example systems 700 and 750 can be similar to and used in combination with the systems described above with regard to FIGS. 1-6. The systems 700 and 750 can be used to add annotations to the object models for webpages, where the annotations are additional details and/or information generated by systems, such as a page segmentation engine. The annotations can include additional details that can enhance and/or annotate portions of the object model, which can aid in enhanced analysis of the webpage and its content by other systems, such as the web content analyzer 432.

Referring to FIG. 7A, the example system 700 is similar to the system 200, but with the addition of page analysis/annotation engines 702 that are configured to analyze the webpage (i.e., HTML 202, script 204, DOM 212, CSSOM 214) and/or the object model 216 of the webpage to determine annotations based on the analysis. An example analysis/annotation engine depicted as part of the example system 700 is a page segmentation engine 704 (similar to the page segmentation engine 440 described above with regard to FIG. 4). Other analysis/annotation engines are also possible. The page segmentation engine 704 can, for example, identify segments that are associated with the nodes for the webpage that are represented in the object model 216 and can add them inline within the object model 216. An example depiction of this is presented with example segment annotations 706-712 being added in-line with the webpage object model data structure and its data elements 218-236. For example, the first node 218 can be identified as part of segment X by the annotation 706.

Such annotation information (e.g., segment information) can provide a variety of efficiencies and improvements to object models, such as by storing information within the object model that may be accessed and used by multiple other, downstream systems (e.g., web content analyzers 432-440). By storing information inline instead of in a database that would have to be accessed at runtime by each of the content analyzers 432-440, it can make processes using the object models more efficient by reducing the database calls and network traffic to query and respond with the annotation information. Additionally, by storing the annotation information inline instead of determining it at runtime, it can also make the process of using the objects more efficient by permitting the content analyzers 432-440 to process the information without having to wait for a response from an annotation engine 702.

Referring to FIG. 7B, the example system 750 presents an example annotating object models for two webpages 750*a* (page1) and 750*b* (page2) from a website with segment information using the page segmentation engine 704, which can identify common page segments across the webpages 705*a-b*. For example, the page segmentation engine 704 can access page data 776 and/or object models 778 for the pages 750*a-b* and identify headers, menus, titles, content, and footers 752-774 (example segments). Each of these segments can be designated with a unique identifier by the page segmentation engine 704, which in the depicted example range from Segment1-Segment9. These segment identifiers can be stored in a page segment database 782, a simplified example of which is depicted in 786. As depicted in the example, some segments can appear across multiple pages P1 and P2 (i.e., Segment1, Segment3), whereas others may only appear in one of the pages (i.e., Segment2).

The object model builder 208 can access the page data 776 to generate object models 778 for the pages P1-P2 (750*a-b*), which can be stored in the object model database 784. The object model builder 208 can access the page segment data 780 that is generated by the page segmentation engine 704 and use the segment information to further annotate the object models. For example, as depicted in the example and simplified object models 788-790, the nodes can be annotated with the corresponding segment identifiers (i.e., Segment1-Segment9) in the object models. As depicted, these identifiers can reference unique identifiers that are resolved via a separate system from the object model builder 208, which in this case is the page segmentation engine 704 and the page segment database 782. Alternatively, the page segment information may be encoded within the object model itself (i.e., encoded with enumerated value identifying type of segment (e.g., menu, header, footer) instead of specific segment (e.g., specific header that is Segment1)). The segment information, as well as other annotation information, may draw on inferences and analysis from other webpages beyond just the webpage to which the object model pertains. For instance, the object model 788 for page P1 750a include annotations that are derived by the page segmentation engine 704 through analysis of the pages P1 and P2 (750a-b) together to determine the segments.

Figure 8:
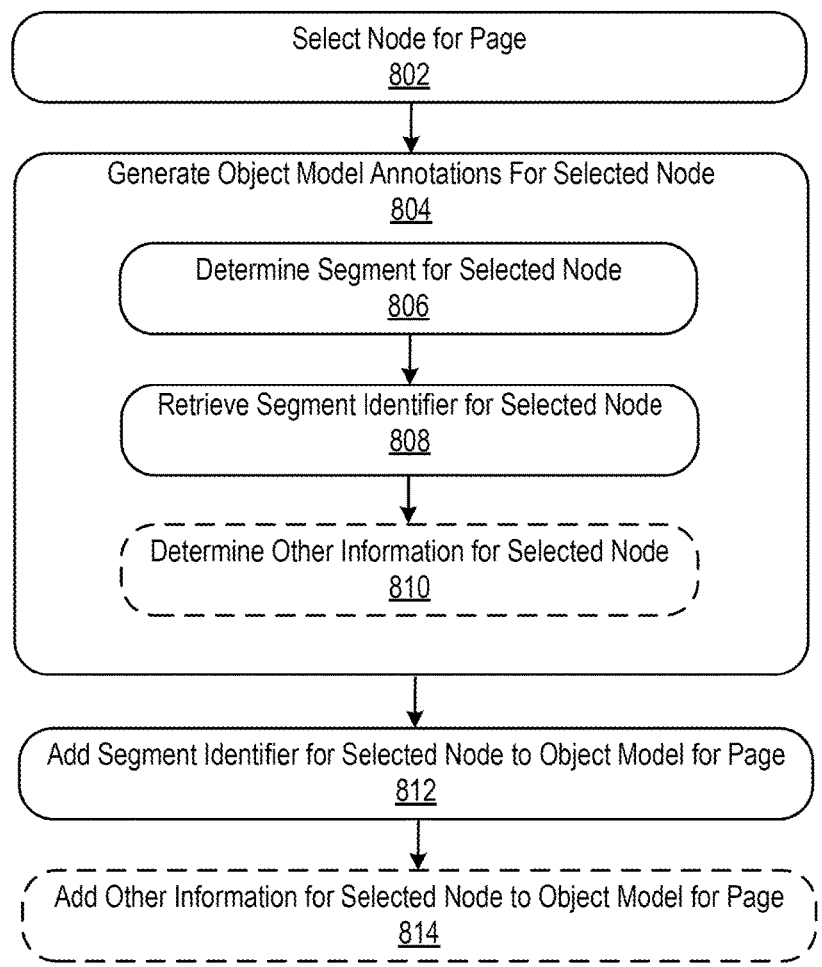
FIG. 8 is a flowchart of an example process for adding annotations to an object model of a webpage.

FIG. 8 is a flowchart of an example process 800 for adding annotations to an object model of a webpage. The example process 800 can be performed by any of a variety of systems and/or devices, such as the web content analysis system 102 and its component parts, the object model builder 208, the web content analysis system 402, the object model builder 508, and/or the systems 700 and 750, such as by the page analysis annotation engines 702 and/or the page segmentation engine 704. The example process 800 may additionally be performed in combination with and/or as part of any of a variety of other processes, such as the processes 300, 600, and/or 650. For example, the process 800 can be performed as part of step 308 of process 300 and/or step 614 of process 600.

A node for a page can be selected (802) and object model annotations can be generated for the selected node (804). A segment for the selected node can be determined (806) and a segment identifier for the selected node can be retrieved (808). For example, the page segmentation engine 704 can process the node, determine a segment for the node, and provide a segment identifier and/or other information for the segment. In some instance, other information for the selected node can also be determined (810), such as through the use of other annotation/analysis engines that are part of the analysis/annotation engine 702. The segment identifier/information for the selected node can be added to the object model for the page (812) and other information determined in step 810 for the selected node can be added to the object model for the page (814).

Figure 9:
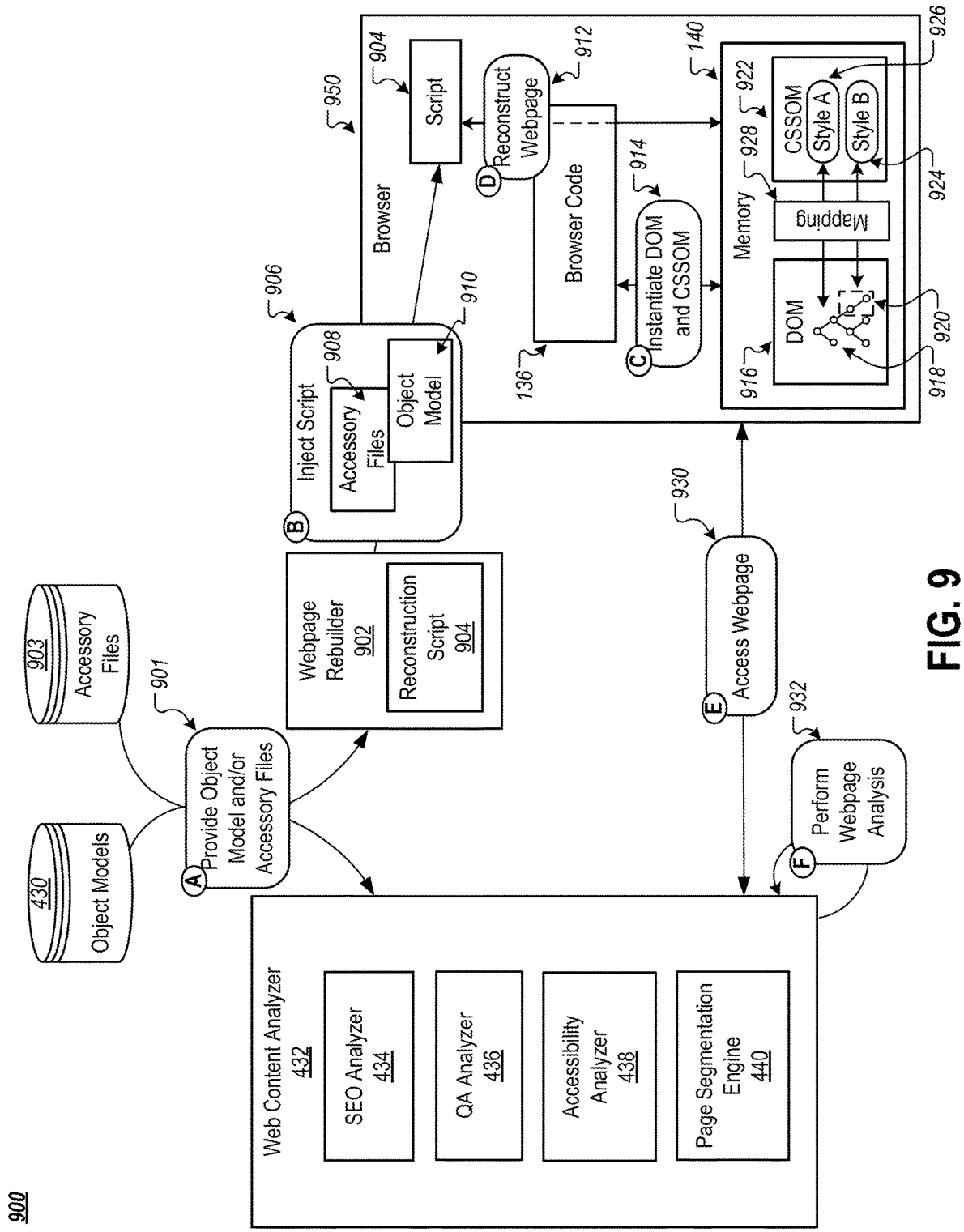
FIG. 9 is a conceptual diagram of an example system for reconstructing a webpage using an object model of the webpage.

FIG. 9 is a conceptual diagram of an example system 900 for reconstructing a webpage using an object model of the webpage. The example system 900 can be similar to and used in combination with the systems described above with regard to FIGS. 1-8. The system 900 can be used to reconstruct webpages from object models so that they can be used by other systems, such as the web content analyzer 432 and its components 434-440. The system 900 includes a webpage rebuilder 902 and a reconstruction script 904, similar to the webpage rebuilder 444 and the reconstruction script 446 described above with regard to FIG. 4.

Databases storing object models 430 and accessory files 903 (i.e., images, videos, other non-webpage files referenced in the webpage code) for webpages can provide the object model and/or accessory files for a webpage, as shown in step A (901). The accessory files for a webpage can be stored as accessory files 903 and global references to those files within the webpage can be redirected to unique identifiers for those files within the accessory file database 903. Alternatively, the accessory files may continue to have global identifiers that are contained in the object model and that can be used to retrieve the accessory files anew and as needed when using the object model. Some analysis by the web content analyzer 432 and its components 434-440 may be performed using the static object model and/or the accessory files from the databases 430 and 903. Some analysis may additionally and/or alternatively be performed via the webpage rebuilder 902 and reconstruction script 904.

The webpage rebuilder 902 can inject the reconstruction script 904 into a browser 950 with the accessory files 908 and/or the object model 910 (step B, 906), which can interface with the browser code 136 to instantiate a DOM 916 and CSSOM 922 in memory 140 (step C, 914) and then to reconstruct the webpage by injecting DOM and CSSOM elements form the object model 910 into a DOM 916 and CSSOM 922 (step D, 912). The browser 950 can be any of a variety for browsers, such as a headless browser (e.g., the headless browser 132), a browser with a corresponding user interface, and/or other types of browsers. Reconstructing the webpage can include recreating a normal portion 918 of the DOM 916 as well as the shadow DOM 920, instantiating styles 924 and 926 (including styles for different document fragments in the page), and mappings 928 between the DOM 916 and CSSOM 922. Reconstructing the webpage can additionally and/or alternatively include rendering the webpage as represented in the object model 910 and presenting it in a user interface based on the reconstructed DOM 916, CSSOM 922, and mappings 928 there between.

The webpage rebuilder 902 can provide web content analyzer 432, its components 434-440, and/or other systems/services with access to the webpage as reconstructed in the browser 950 (step E, 930). Using the reconstructed dynamic webpage in the browser 950 and/or the static object models 430 and/or accessory files 903, the web content analyzer 432, its components 434-440, and/or other systems/services can perform webpage analysis (step F, 932).

Figure 10A:
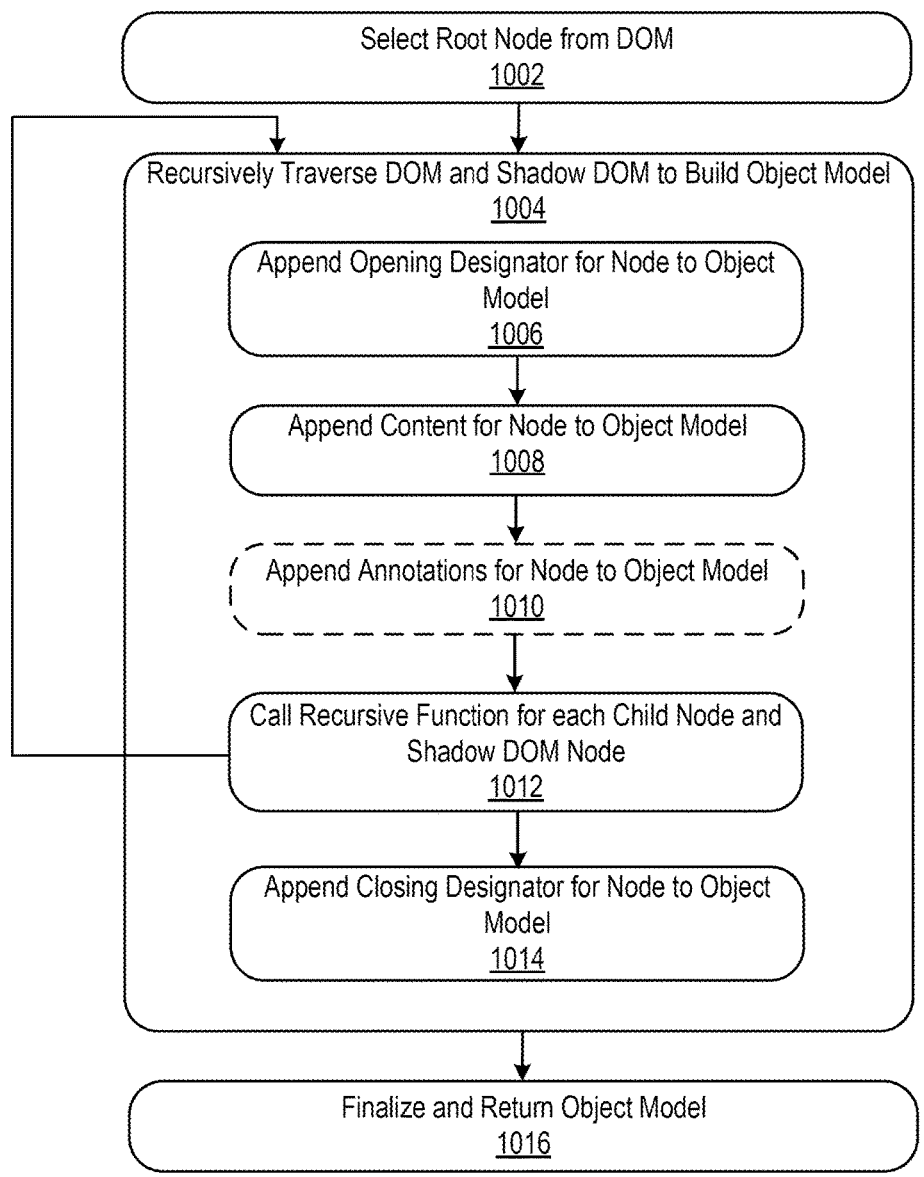
FIGS. 10A-B are flowcharts of example processes for generating an object model of a webpage.
Figure 10B:
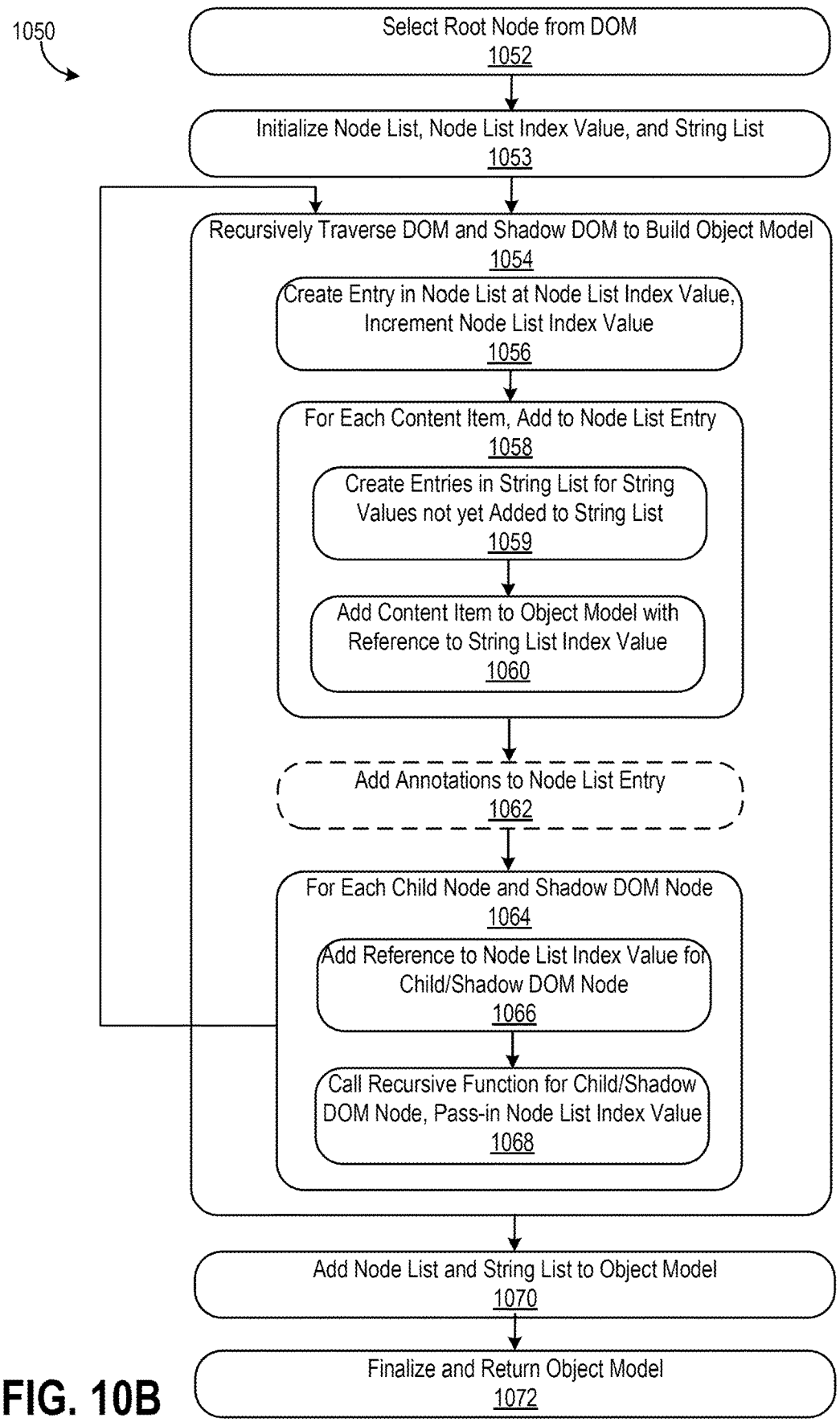

FIGS. 10A-B are flowcharts of example processes 1000 and 1050 for generating an object model of a webpage. The example processes 1000 and 1050 can be performed by any of a variety of systems and/or devices, such as the web content analysis system 102 and its component parts, the object model builder 208, the web content analysis system 402, the object model builder 508, the systems 700 and 750, and/or the system 900. The example processes 1000 and 1050 may additionally be performed in combination with and/or as part of any of a variety of other processes, such as the processes 300, 600, 650, and/or 800. For example, the processes 1000 and 1050 can be performed as part of steps 308, 312, and/or 316 of process 300 and/or step 614 of process 600.

Referring to FIG. 10A, the process 1000 creates an object model in which the nodes and their relationships to each other are provided by a nested relationship, such as the a child node being defined within the parent node, as well as all of the children nodes of the child node. Such nesting can be provided, for example, by using data structures that define data elements being contained within or as part of a data element, such as through opening and closing braces defining the data element for a parent node and the child node being contained within the opening and closing braces. Other opening and closing designators can be used, though, such as other characters (i.e., brackets) and/or spacing (e.g., line returns, indentation). A root node for the DOM can be selected (1002) and recursive traversal of the DOM and shadow DOM can be performed (1004), similar to the description above with regard to FIG. 3. An opening designator for the selected node can be appended to the object model (1006), such as an opening brace character ("{"), Content for the node can be appended to the object model (1008) within the open designator and, in some instances, annotations for the node can be appended to the object model (1010) within the open designator. The recursive function can be called for each child node and shadow DOM node (1012)—meaning that the opening designator for each of these child nodes and shadow DOM nodes will be appended within the open designator for the selected node. After the recursive functions return for all child and shadow DOM nodes, then the closing designator for the selected node will be appended to the object model (1014). Once all nodes have been traversed, the object model is finalized and returned (1016). The resulting object model from process 1000 is similar to the object model 216 depicted in FIG. 2.

Referring to FIG. 10B, the example process 1050 generates an object model that uses a node list where child nodes and shadow nodes are referenced by their index value within the node list, which avoids the nested structure of process 1000. The process 1050 also uses a string list where unique string values are referenced within the nodes via their string index, which permits for common strings to be contained a single time within the object model and referenced from multiple different nodes via the string index value. Depending on the structure and content of the webpage for which the object model is being generated, the process 1050 may result in a smaller, more compact object model than the process 1000 due to the flattened/non-nested structure, as well as through the use of an index of unique string values. Additionally, object models generated by the process 1050 may be more efficient for other systems to analyze and process, and may use fewer computing resources to process (i.e., less memory to regenerate the node structure). An example resulting data structure from the process 1050 is depicted in FIGS. 11A-B.

The root node can be selected from the DOM (1052) and data structures used for the object model can be initialized, including the node list, the node list index value, and the string list (1053). The DOM tree and shadow DOM can be recursively traversed to build the object model (1054). An entry in the node list can be generated at the node list index value for the selected node and then then node list index value can be incremented (1056). For each content item or element of the node (e.g., content, attributes, node type), the items/elements can be added to the created entry in the node list (1058), which can include creating entries in the string list for string values that are not yet present in the string list (1059) and adding items/elements to the created entry using corresponding string list index values (1060). The string list can include any string, such as HTML tags, scripts, textual values, and/or other strings. A process similar to 1058-1060 can be performed for annotations being added to the object model (1062). For each child node and shadow DOM node of the selected node (1064), a reference to the node list index value for the child/shadow DOM node can be added to the created entry for the node (1066) and the recursive function can be called for each child/shadow DOM node, passing-in the node index value designated for that node (1068). The node list and string list can continue to be constructed for each child and shadow DOM node via steps 1054-1068, and once completed the node list and the string list can be added to the object model (1070). The object model can then be finalized and returned for the page (1072).

Figure 11A:
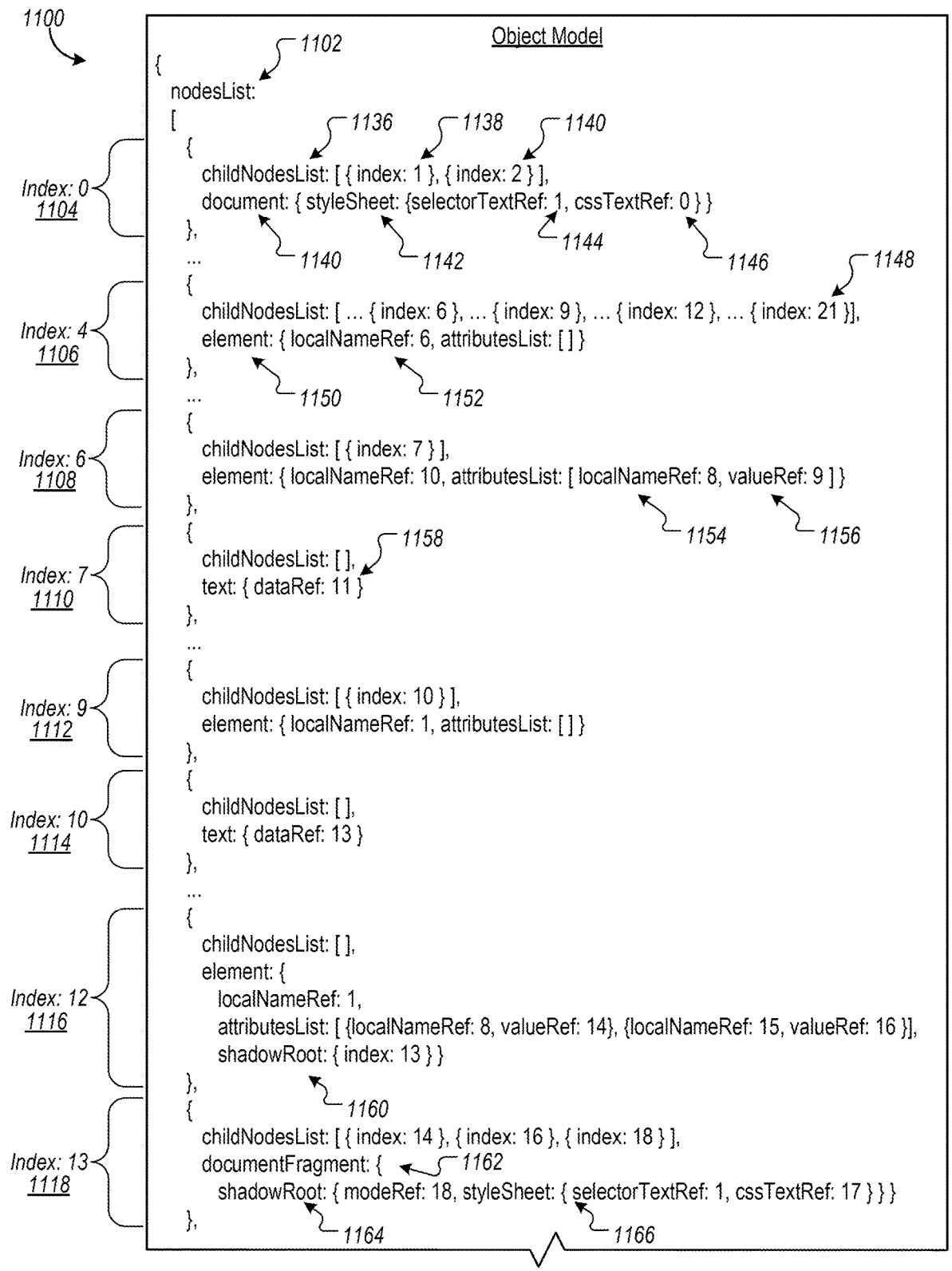

FIGS. 11A-B depicts an example object model 1100 generated using node and string references. The example object model 1100 can be generated by any of a variety of processes, such as the process 1050 described above with regard to FIG. 10B.

The example object model 1100 includes a node list 1102 with example node list entries 1104-1134 and a string list 1168 with example string list entries 1170-1172. The example node list entries 1104-1134 are identified with their node list index values (e.g., "index: 4"), and the example string list entries 1170-1172 are designated in-line with their corresponding string list index values (e.g., "0: 'font-weight: bold'"). The index values are presented for illustrative purposes, and are not required to be part of the resulting object model 1100.

For the first node entry 1104 (at node list index "0"), there are two child nodes 1138-1140 designated as part of the "childNodeList" element 1136. These child nodes 1138-1134 are identified by their corresponding index value in the nodesList 1102. The first node entry 1104, which could be considered to be the root node, also identifies the "document" element 1140 includes a stylesheet element 1142 with a selectorTextRef element 1144 and a cssTextRef element 1146. In the depicted example, elements ending in the suffix "-Ref" refer to an index value for the string list 1168. Accessing the string list 1168, the value for the selectorTextRef element 1144 is "div" (string list element 1172 at string list index "1"), and the value for the cssTextRef element 1146 is "font-weight: bold" (string list element 1170 at string list index "0").

The node entry 1106 (node list index "4") includes child nodes 1148 that directly and indirectly correspond to regular portions of the DOM, such as nodes 1108-1116, and also nodes that identify and correspond to the shadow DOM, such as the shadowRoot node 1118 (node list index "13"), which is identified in node 1116 by the shadowRoot element 1160, and the child nodes 1120-1130 of the shadowRoot node 1118. The shadowRoot node 1118 includes a document fragment element 1162, which identifies the shadowRoot 1164 along with the corresponding styles 1166 that apply to the document fragment. Nodes for the regular DOM and the shadow DOM can be interspersed within the node list 1102, and can also share string list values for common string values based on their corresponding string identifier.

Any of a variety of different elements can use the same string list and values, such as for "element" 1150 and its localNameRef element 1152, the localNameRef 1154 and valueRef 1156 that are part of an attributesList, and a dataRef 1158. As discussed above, the string list can include any string, such as strings identifying styles (e.g., string 1170), tags (e.g., string 1172), and scripts (e.g., string 1174).

The example object model 1100 that is depicted in the example corresponds to the simplified example webpage that is described above with regard to FIG. 2. When cross-referencing the various node and string indices, the following elements are provided by the object model 1100:

Node 1106: corresponds to the "<body>" element in the DOM 212,

Nodes 1108-1110: correspond to the definition of the "styleA" element in the DOM 212 and the CSSOM 214, Nodes 1112-1114: correspond to the "<div>" element with the text "List Title" in the DOM 212, Nodes 1116-1118: correspond to the "#shadow-root" element in the DOM 212, Nodes 1120-1122: correspond to the "<div>" element with the text "List item 1" in the DOM 212, Nodes 1124-1126: correspond to the "<div>" element with the text "List item 2" in the DOM 212, and Nodes 1128-1134: correspond to the definition of the "styleB" element in the DOM 212 and CSSOM 214.

Figure 12:
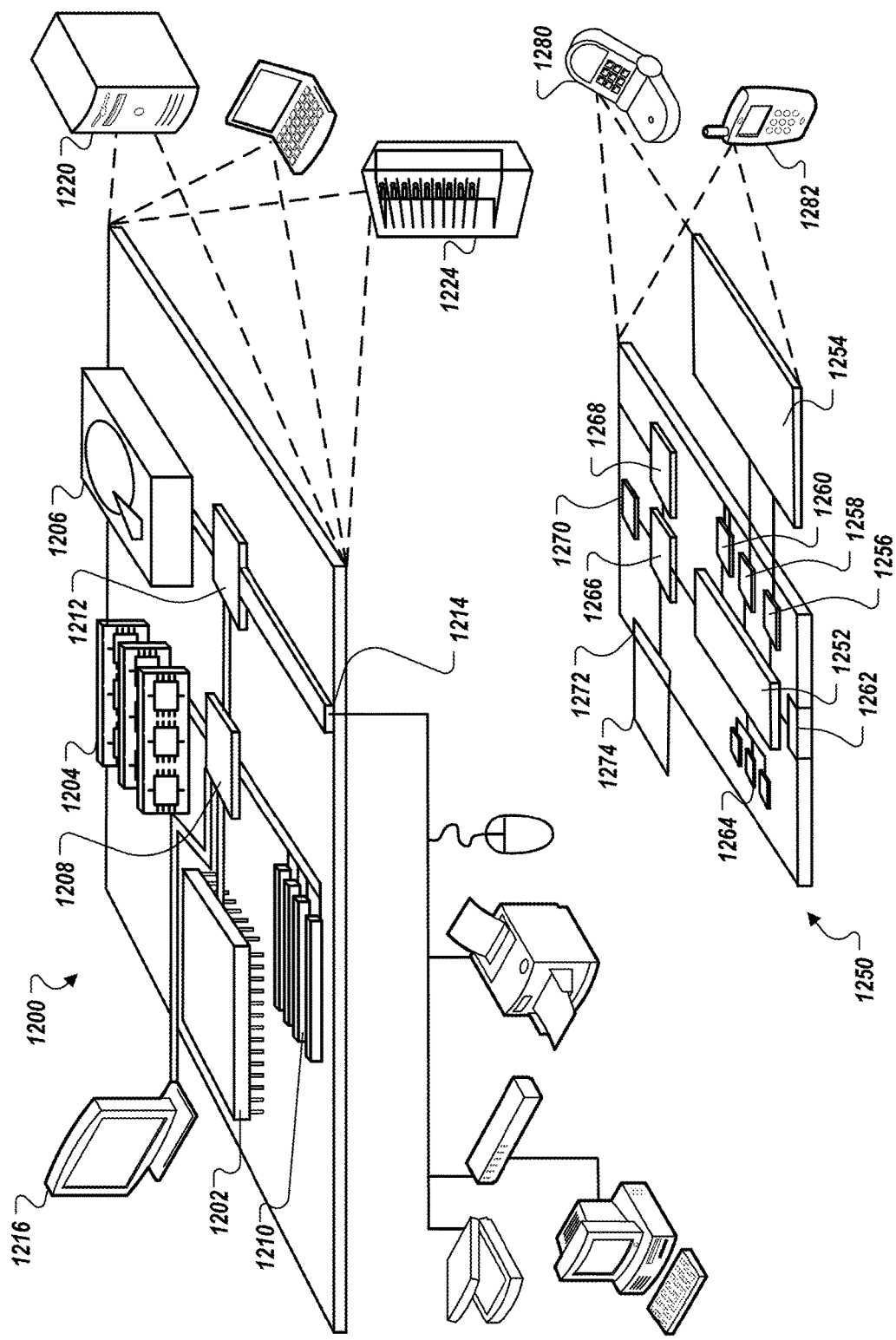
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the computing device 1200. In some implementations, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In the implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some implementations, or for wireless communication in other implementations, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250, or can also store applications or other information for the mobile computing device 1250. Specifically, the expansion memory 1274 can include instructions to carry out or supplement the processes described above, and can include secure information also. Thus, for example, the expansion memory 1274 can be provide as a security module for the mobile computing device 1250, and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1268 using a radio-frequency. In addition, short-range communication can occur, such as using a Bluetooth, WiFi, or other such transceiver (not shown). In addition, a GPS (Global Positioning System) receiver module 1270 can provide additional navigation- and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for generating a static object model of a dynamic webpage, the method comprising:
   receiving, at a computer system, a webpage from a web server;
   instantiating, by the computer system, a headless web browser application to render the webpage, wherein the headless web browser includes browser memory and is configured to render the webpage by creating a document object model ("DOM") and a cascading style sheet object model ("CSSOM") in the browser memory, the DOM and the CSSOM representing dynamic rendered content of the webpage;
   injecting, by the computer system, a probe script into the headless browser, wherein the probe script is configured to retrieve the dynamic rendered content of the webpage;
   traversing, by the probe script, the DOM, including traversing regular nodes of the DOM and shadow nodes of a shadow DOM that is attached to regular nodes of the DOM;
   retrieving, by the probe script, dynamic information for the regular nodes and the shadow nodes from, at least, the DOM and CSSOM, wherein the information includes style information for the DOM and shadow style information for the shadow DOM;
   building, by the computer system, a static object model of the webpage based on the dynamic information, wherein the static object model including (i) the regular nodes, (ii) the shadow nodes, (iii) the style information for the DOM, (iv) the shadow style information, and (v) structural features delineating separate styles applying to the regular nodes and the shadow nodes; and
   outputting, by the computer system, the static object model for the webpage.

2. The method of claim 1, wherein traversing the nodes of the DOM comprises recursively traversing the DOM using a recursive function that instantiates separate recursive instances for child nodes and shadow host nodes to which a shadow root node is attached.

3. The method of claim 1, wherein:
   the static object model includes one instance of the style information for the DOM that is positioned within an hierarchical structure of the static object model to indicate an association with only the regular nodes, and
   the static object model includes one instance of the shadow style information for the shadow DOM that is positioned within the hierarchical structure of the static object model to indicate an association with only the shadow nodes.

4. The method of claim 1, wherein the traversing is performed in response to detected a load event generated by the headless browser for the webpage.

5. The method of claim 1, further comprising:
   simulating, by the probe script, an additional state of the webpage in the headless browser;
   traversing, by the probe script, the DOM in the additional state, including traversing the regular nodes and the shadow nodes in the additional state;
   retrieving, by the probe script, dynamic state information for the regular nodes and the shadow nodes in the additional state; and
   adding, by the computer system, the dynamic state information to the static object model for the regular nodes and the shadow nodes.

6. The method of claim 5, further comprising:
   determining, by the computer system, whether the dynamic state information is different from the dynamic information for the nodes and the shadow nodes;
   wherein only portions of the dynamic state information that are determined to be different from corresponding portions of the dynamic information are added to the static object model.

7. The method of claim 6, wherein the dynamic information added to the static object model comprises difference information identifying only differences between the dynamic state information and the dynamic information.

8. The method of claim 5, wherein the dynamic state information is added to the static object model as data fields within data structures for the regular nodes and the shadow nodes already added to the static object model based on the dynamic information.

9. The method of claim 5, further comprising:
   identifying a plurality of dynamic elements that are part of the webpage;
   wherein the simulating, the traversing, the retrieving, and the adding with regard to the additional state are performed for each of the plurality of dynamic elements.

10. The method of claim 9, further comprising:
    identifying a plurality of input options for each of the dynamic elements;
    wherein the simulating, the traversing, the retrieving, and the adding with regard to the additional state are performed for each of the input options for each of the plurality of dynamic elements.

11. The method of claim 1, wherein the static object model is configured to be used by multiple different webpage analysis pipelines to analyze the dynamic content of the webpage without rendering the webpage.

12. The method of claim 1, wherein the static object model is built with a hierarchy of nodes having relationships that are represented by nested relationships among the regular nodes and the shadow nodes.

13. The method of claim 12, wherein the shadow nodes are represented together and nested within the relationships with the regular nodes.

14. The method of claim 1, wherein the static object model is built with a nodes list that stores the regular nodes and the shadow nodes in an array that is addressable via a nodes list index.

15. The method of claim 14, wherein child nodes are identified within the regular nodes and the shadow nodes using references to node list index values for the child nodes.

16. The method of claim 14, wherein the static object model is further built with a strings list that stores unique string values from the regular nodes and the shadow nodes in an array that is addressable via a string list index.

17. The method of claim 16, wherein the regular nodes and the shadow nodes include references to common string list index values.

18. The method of claim 1, further comprising:
identifying one or more annotations for at least a portion of the regular nodes and at least a portion of the shadow nodes;
adding the one or more annotations to the at least a portion of the regular nodes and the at least a portion of the shadow nodes in the object model.

19. The method of claim 18, wherein the one or more annotations correspond to identifications of page segments in the webpage using a segmentation engine.

20. The method of claim 19, wherein the identifications of the page segments are determined for a website that includes the webpage and other webpages.

\* \* \* \* \*